United States Patent [19]
Reis et al.

[11] Patent Number: 5,686,902
[45] Date of Patent: Nov. 11, 1997

[54] COMMUNICATION SYSTEM FOR COMMUNICATING WITH TAGS

[75] Inventors: Robert Steven Reis; Vikram Verma, both of Palo Alto; Domingo Antonio Mihovilovic, Mountain View; Peter Scott Bertrand, Palo Alto; Richard Kenneth Stevens, Cupertino, all of Calif.

[73] Assignee: Texas Instruments Incorporated, Dallas, Tex.

[21] Appl. No.: 636,665

[22] Filed: Apr. 23, 1996

Related U.S. Application Data

[60] Division of Ser. No. 148,552, Nov. 8, 1993, Pat. No. 5,640,151, which is a continuation-in-part of Ser. No. 710, 825, Jun. 5, 1991, abandoned, which is a continuation-in-part of Ser. No. 538,546, Jun. 15, 1990, abandoned.

[51] Int. Cl.$^6$ .................................................. H04Q 1/00
[52] U.S. Cl. .................. 340/825.54; 340/825.49; 342/457
[58] Field of Search ............... 340/825.54, 825.49, 340/825.15; 342/457

[56] References Cited

U.S. PATENT DOCUMENTS

| | | | |
|---|---|---|---|
| 4,510,495 | 4/1985 | Sigrimis | 340/825.54 |
| 4,636,950 | 1/1987 | Caswell | 340/825.54 |
| 4,691,202 | 9/1987 | Denne | 340/825.54 |
| 5,003,317 | 3/1991 | Gray | 342/457 |
| 5,426,421 | 6/1995 | Gray | 340/825.15 |

OTHER PUBLICATIONS

Websters ninth new collegiate Dictionary. 1985 pp. 128.

*Primary Examiner*—Brian Zimmerman
*Attorney, Agent, or Firm*—Robert C. Klinger; James C. Kesterson; Richard L. Donaldson

[57] ABSTRACT

A communication system for identifying, locating, tracking and communicating for other purposes with large numbers of tags in a time and energy efficient manner. The tags are associated with items located in a communication region that is interrogated by an interrogator on a one-to-many basis using broadcast commands, on a one-to-one basis using directed commands or on a combination basis using both methods. Identification occurs through organized transmission and reception of signals between the tags and the interrogator. A batch collection protocol uses a combined one-to-many and one-to-one communication system that effectively resolves communication contentions. The batch collection protocol employs a plurality of collection periods which communicate with large or unknown numbers of portable tags.

66 Claims, 5 Drawing Sheets

COMMUNICATION SYSTEM FOR COMMUNICATING WITH TAGS

CROSS-REFERENCE TO RELATED APPLICATIONS

This application is a divisional application of U.S. application SC/Ser. No. 08/148,552, filed Nov. 8, 1993, now U.S. Pat. No. 5,640,151, which is a continuation-in-part of U.S. patent application Ser. No. 07/710,825, filed Jun. 05, 1991, now abandoned, which is a continuation-in-part of U.S. patent application Ser. No. 07/538,546, filed Jun. 15, 1990, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention is a communication method and apparatus for communicating with tags in a communication region and particularly for communicating to locate, track and identify tags in a communication region. The present invention is particularly useful where large numbers of tags are present in the communication region, where the locations or identities of the tags in the communication region are not necessarily known, where transport of the tags to and from the communication region is not necessarily restricted and where contentions among communications to and from tags need to be resolved in a time and energy efficient manner.

Tags can be attached to items such as pain, equipment, furniture, vehicles or to persons, to livestock or to any object having requirements to be tracked, located, or identified. Communications with the tags may be for the purposes of inventory, stock location in warehouses, determination of work-in-progress status, environment history, personnel location or for other purposes necessary for the efficient operation of a process. Examples of such processes are manufacturing, warehousing, inventory management, storage and transfer facilities and personal communication systems.

The communication region in which the communication occurs to identify, locate or track tagged items may be small or large, cellular or single celled or may have other characteristics. For example, in inventory or tracking applications, items may be in widely separated locations in a warehouse or may be grouped closely together in a small storage container. Also, tags may be attached to compound items having components where each component is itself a tagged item. Examples of such compound items are manifests, bills of lading, manufacturing travelers, transport trailers, containers or similar elements.

Communication systems have been developed for locating, tracking or identifying tags. For example, simple written lists or automated machines such as bar code readers or similar devices have been implemented for inventory tasks. The procedure for communicating with each of the tags can be simple if there are a relatively few tags or if the tags are readily accessible. Simple procedures usually have either a reader or other device brought to the tags or have the tags brought to the device. Such procedures require knowledge of the location of each item. If the location of an item is not known, the item must first be located before the procedure can occur. A significant amount of time may be required for those items positioned in relatively inaccessible areas such as a box interior or a remote shelf location.

Simple procedures may be adequate for small numbers of items or for items whose location is known or where the tag is easily accessible, however, for large numbers of items or if repositioning, unpacking or disassembly of items is required (for example in order to gain access to compound items), the simple procedures become complex and time consuming. For large numbers of items, the methods that may work for small numbers of items are inadequate.

One application of an identification system for large numbers of tagged items is in connection with a manufacturing facility. For example, an airplane manufacturing facility will have a large inventory of airplane parts (thousands of items) stored in a warehouse. New parts will be regularly received into the warehouse while other parts will be regularly withdrawn from the warehouse for use in manufacturing the airplanes. From time to time, items within the warehouse will be moved from one location to another. In the identification system, the warehouse is the communication region and each item has an attached tag and the warehouse has one or more interrogators in one or more cells for communicating with all the tags in the warehouse. This is an example of a wide area tracking system.

Another use of an identification system is in connection with a parcel delivery service where many packages are transported from a sender to a receiver through trucks which are at different locations within cities and within other regions of the country or world. Each truck typically has many packages (hundreds of items) regularly received into the truck while other packages are regularly withdrawn from the truck for delivery. From time to time, items within the truck are moved from one location to another. In the identification system, each truck is a communication region and each item has an attached tag and the truck has one or more interrogators in one or more cells for communicating with all the tags in the truck. The entire fleet of trucks forms an expanded communication region where each truck is a separate region and the regions are not necessarily contiguous.

Still another use of an identification system is for work-in-progress tracking. For example, an aircraft engine repair facility requires tracking the engine through the various stages of repair or overhaul, a process that may take a considerable length of time and require frequent moving and temporary storage of the engine. To manage this process requires an identification system that can locate, identify and track items in an unstructured environment.

Another use of an identification system in an unstructured environment is for sensor monitoring. For example, temperature gauges can be attached to items distributed in one or more regions of a cold storage facility where it is desirable to periodically monitor the temperature at each gauge and to note the temperature or whether or not an alarm temperature or other parameter has been exceeded. An effective communication system is required in order to identify and interrogate the numerous items without the necessity of having to locate or access each of the items individually, thus allowing the freedom to relocate items from time to time without regard to the ability to interrogate the items at a future time.

Thus a need exists for an accurate and efficient system that locates, identifies, tracks or otherwise communicates with large numbers of items. The system must operate in a time and energy efficient manner without the need to unpack or disassemble storage containers, without the need to be physically close to the items and without the need for a rigorous manual bookkeeping system to keep track of the items and their status, particularly if the items are moveable within a region.

A number of communication systems exist for identification, location or tracking of items and these systems are based upon many different technologies. Some of the communications may be in a broadcast mode (one to many) where an interrogator broadcasts to many tags, others may be in a one-to-one mode where communication is between one interrogator and one tag. Examples of one-to-one systems are optical bar code readers, optical character readers and magnetic stripe readers, all commonly used in identification systems. The communication range of these systems is typically less than a meter, limiting their application to use where the tags are in close proximity to a reader. Because such systems require close proximity for interrogation, they are of little value when the location of the item is unknown or when it is desired to communicate over a larger communication region such as a warehouse, a truck or other large region.

Radio frequency (RF) identification systems have been used for identification and tracking where an increased range, relative to the short range of proximity detectors, is required. One type of RF system uses magnetically coupled tags affixed to the items to be identified. In such magnetic coupling systems, tags are energized by movement of the tag through a magnetic field generated by an interrogator and the energized tags magnetically couple energy back to the interrogator. These systems find application in inventory control where items pass through portals. For instance, shrink-wrap packages such as computer software or tagged clothing in retail establishments effectively use magnetic coupling systems.

Magnetically-coupled tags are inherently restricted to close-range communications not extending beyond several meters because such tags use small loop antennas that operate at VLF frequencies that have a low coupling efficiency. While larger antennas are theoretically possible, in actual practice small loop antennas are required to avoid excessive tag size. This antenna size limitation precludes the use of such systems in other than small areas with small numbers of tags within the communication region. These systems are also not effective when the location of the tag is not known since, in these systems, the tag must be moved through the interrogation field of the reader thus necessitating prior knowledge of the tag location.

Another type of radio frequency (RF) system uses passive reflecting tags affixed to the items to be identified. When the items having tags are positioned within the range of the radiation radiated from an RF source, the tags are energized by the incident RF radiation at the tags. The tags modify the incident RF radiation and reflect a portion thereof back to a receiver at the RF source thereby producing an identification signal.

The passive RF reflector systems are energy efficient as the tags do not consume power, but instead simply reflect back incident radiation. However, there exist several inherent limitations in passive systems. In passive systems, the signal-to-noise ratio of the reflected identification signal is dependent upon the power level of the incident RF radiation at the tag, the geometry of the reflector and the efficiency of the modification and reflection operations. It is common for the reflected identification signal to be substantially weaker (for example, 100 db weaker) than the incident signal, and therefore, strong incident signals are required for the passive reflectors to work even over limited ranges of small regions.

To increase the power of incident radiation and thereby increase the range of a passive reflector system, passive reflector systems have employed focused radiation rather than omni-directional radiation since the incident power of focused radiation tends to be greater than the incident power of omni-directional radiation. Focused radiation, however, is not, practical for a location system because it requires prior knowledge of the location and direction of the tag with respect to the transmitting source. Although reflective systems are used as verification or security systems, reflective systems have not proved practical for identification systems for items of unknown location or in an unstructured environment.

RF systems employing active communication between interrogators and tags are the most practical method to solve the identification task presented by a large number of tags in an unstructured environment. These active systems typically utilize broadcast techniques allowing a number of tags in an area to be located and identified by RF communication. Presently known active systems, however, although commonly used with small numbers of tags per reader, (typically less than ten), do not possess the orderly and efficient methods necessary to resolve the communication conflicts that arise in applications where large numbers of tags, typically hundreds or thousands, are present. Existing systems are not adequate where large numbers of tags are present and where the tags, in battery-powered operation for example, have a finite and small amount of energy available. Specific examples of proposed communication systems useful in limited environments are known.

Examples are communication systems wherein each tag responds to interrogation during a unique time slot, fixed by a tag address code, at a particular response time after interrogation without any provision for collision resolution. Such a system is limited to interrogating a small number of tags at one time or to only a fixed number of tags and is inadequate for large numbers of tags or for a varying population of tags because these systems have no provision for collision resolution.

Another example is a communication system for interrogating transient tags brought into the field of an interrogator where the interrogator sends a synchronization signal to responsive tags and identifies the responding tags with no acknowledgement to a tag to communicate to the tag that a successful transmission was received by the interrogator. In that system, the interrogator continuously broadcasts interrogation requests and listens for and records, when able, tags which respond. The collisions which inevitably result from two or more tags responding simultaneously to the interrogator are attempted to be overcome by having the tags indefinitely repeat their transmissions at randomly chosen times. Such a system tends to create an unacceptable collision problem in the case of many tags or stationary tags and hence is limited to identification of only a few tags and then only if the few tags are transient at the interrogator station.

As another example, a communication system uses two frequencies, one for interrogators to send and the other for tags to respond using various communication sequences. If more than one tag responds, the tag signals collide and the interrogator will detect errors and copy those errors back to the tags. The tags transmit again and frequently again collide repeating the error transmissions. The tags then go silent and respond again after a random time delay. Such a system is deficient in organizing the energy resource. The system is limited to only a few tags since if expanded to a large number of tags, the system presents an unacceptable level of energy consumption due to the disorganized method of resolving collisions. The response acknowledge cycle of each single tag, along with the associated time overhead in error determination, requires constant transmission of signals, consuming an excessive amount of power.

Still another communication system employs multiple frequency responses to interrogation where a transmitter transmits messages to a group of pagers. The transmitter transmits tag addresses in a time-multiplexed group on a single frequency to normally sleeping tags. All tags wake up and listen to the address to determine if their unique address is contained in the group and if so, at what relative position in the sequence. If a tag determines that its address is not in the group of addresses sent, the tag returns to sleep. If the tag determines that its address is in the group, it remains awake to receive a message sent by the central transmitter. Having received its message, the tag sends back to the central transmitter a response signal on a frequency specified by the relative position of the tag address in the group address transmission. Such a system limits the number of tags that can respond at any one time to the number of frequencies available for responses. Only a small number of frequencies, perhaps as few as twenty, are practical due to design tradeoffs between the number of frequencies needed and the frequency precision required of the transmitter and receiver design. The antenna design also becomes more expensive and complex due to the wide frequency bandwidth within which such systems must be responsive.

The communication systems described by way of example, and other proposed systems, are unable to satisfy the need to identify one or more of a plurality of tags within a given area, to resolve collisions in the responses of interrogated tags and to accomplish these tasks in a time and energy efficient manner for a large number of tags.

In view of the above background, there is a need for highly efficient communication systems capable of operation in an orderly and time and energy efficient manner with large numbers of tags to communicate with all tags for purpose of inventory or for other purposes.

For an effective communication system for communicating with items in a communication region to locate, track, or identify the items or to communicate with the items for other reasons, many factors must be considered including the following.

The size of the communication region determined in part by the communication range of the signals from interrogator to tags and from tags to interrogator.

The rate at which tags are introduced into and removed from the communication region.

The number of tags which are within the communication region at any one time where a large number may be hundreds or thousands or more and a small number may be none or a few.

The nature and number of communication channels between the tags and the interrogators.

The bandwidth of the communication channels between the tags and the interrogators.

The reliability of the communication channels.

The efficiency of time with which the interrogation process can be completed and the speed of communications.

The type of communication protocol that is employed.

The cost of the system and particularly the cost of each tag.

Power requirements including battery life and size for portable operation. Additional desirable features of an identification system are the ability to increase the range of the system over a larger communication region by forming adjacent communication cells in a cellular system where each cell includes an interrogator that communicates with tags over a part of the larger communication region so that a plurality of such interrogators together effectively communicate over the entire communication region. Such a system, having coordinated communications among the cells, defines a wide area identification or asset tracking system.

In summary, efficient communication systems are needed that take inventory of, or for other purposes communicate with, tags within a communication region. Since the number of tags may be hundreds or thousands, the communication protocol is significant and must consider cost, reliability, accuracy, energy efficiency and the other factors identified above. Also, since tags are transportable when attached to transportable items, the tags are typically battery operated and hence the need to conserve power in order to extend battery life is of major consideration.

SUMMARY OF THE INVENTION

The present invention is a communication system that communicates for identifying, locating, tracking or that communicates for other purposes with large numbers of tags in a time and energy efficient manner. The tags are located in a communication region that is interrogated by an interrogator on a one-to-many basis using broadcast commands, on a one-to-one basis using directed commands or on a combination basis using both types of commands. Identification occurs through organized transmission and reception of signals between the tags and the interrogator. The number or the locations of the tags (and associated items) within the communication region are not necessarily known to the interrogator.

The present invention employs, in one embodiment, a batch collection protocol that efficiently and effectively resolves communication contentions. The batch collection protocol uses a plurality of organized, time and energy efficient interrogator initiated collection periods which communicate with large numbers or unknown numbers of portable tags.

In the collection protocol, one-to-many communications occur to direct a plurality of tags to perform a specific function. An example of a one-to-many communication is an interrogator's command that all tags in the region of the interrogator transmit tag IDs to the interrogator. A one-to-one communication occurs to direct only a specific tag to perform a specific function. An example of a one-to-one communication in the collection protocol is an interrogator command to a specific tag to acknowledge receipt of the tag ID. Other specific functions include, for example, the energizing of a sound device (beeper), the reporting of the results of a data collection, a temperature recording or other transfers of data from interrogator to tag or from tag to interrogator. These communications are performed under the direction of the interrogator or the direction of an external system such as a computer.

To perform inventory functions, the interrogator employs batch collection protocol wherein communication signals are processed during a batch session. The batch session includes a plurality of collection periods, each collection period comprising a listen period and an acknowledge period. In the batch session, the quantity of collection periods and the durations of the listen periods are controlled individually, thus providing a means to identify a large number of tags in an orderly and time and energy efficient manner and to effectively resolve communication contentions.

During the listen period of each collection period, each of the unidentified tags is allowed to transmit tag identifying signals to the interrogator only on. During any particular listen period, only a subset of tags is likely to successfully transmit identifying signals to the interrogator because, for large numbers of tags, tag communications often collide. To enhance the probability that tags will successfully communicate, the transmission time for each tag identifying signal is relatively small compared with the full listen period and the times, during the listen period when particular tags initiate sending their identifying signals, are evenly distributed over the listen period.

During the acknowledge period for each collection period, all tags identified during the preceding listen period are individually acknowledged in a batch by the interrogator. Each acknowledge signal directs the addressed tag not to respond to subsequent collection periods during the current batch session and instead to enter a low-power state so as to conserve battery power. The acknowledge period is interference free since tags are permitted to transmit only during the listen period and are required to remain silent during the acknowledge period.

The duration of each succeeding batch collection period is controlled by the interrogator generally to be shorter in time than the previous period by shortening the listen period, taking advantage of the fact that since tags are collected and acknowledged during previous periods, there remain fewer tags after each period and therefore there is not the need for long or constant duration collection periods. In this manner, the system features a controlled orderly time efficient collection process.

During the batch session, the communication bandwidth during a particular one of the collection periods is matched with the number of tags likely to successfully communicate with the interrogator during that particular one of the collection periods so as to tend not to saturate the communication channel during that collection period nor to extend unnecessarily the duration of the collection period thereby conserving battery power. Additionally, during any given collection period, the communications from tags are distributed over the communication bandwidth available during that collection period so as to tend not to saturate the communication channel during that collection period.

With such distribution of tag communications over different collection periods and the control and distribution of tag communications over the available bandwidth within each collection period, the inventory process is efficiently implemented.

In an embodiment of the present invention where the identification signals and the acknowledge signals share the same common communication channel, the interrogator makes no attempt at transmitting acknowledge signals during the listen period, instead continuing to receive as many identification signals as can be detected during the listen period, storing them for batch processing. The process of storing for batch processing ensures that during the listen period when incoming identification signals are present, no collisions in the communication channel are caused by the interrogator attempting to send acknowledgment signals over the same channel used by the tag identification signals.

The present invention also does not permit repeated transmissions of identification signals from the same tag during the same listen period, but rather forces an unacknowledged tag in one listen period to wait to send until the subsequent listen period thereby further avoiding collisions.

Since the transmission time of the tag identification signal is small relative to the listen period, the probability of tag responses colliding with one another is small and gets even less probable as the collection process continues. The probability of collision in each period is determined by the duration of the listen period, the number of tags unacknowledged and the degree of randomness of the transmit delay for each transmission. Accordingly, the present invention is effective in avoiding saturation and resolving contention.

The batch collection protocol thus operates with a sequence of collection periods where some of the tags are identified in different ones of the collection periods, the duration of succeeding periods being progressively shorter, until all tags within the region are identified.

The present invention also incorporates one-to-one communication wherein the interrogator may direct an individual tag to execute a function such as turning on a beeper for a period of time or to prepare a list of data bytes and transmit the data back to the interrogator. This one-to-one communication does not use the batch collection protocol but instead employs an energy efficient protocol to locate and identify and communicate to one or a subset of the plurality of the tags in the region of the interrogator.

The present invention conveniently employs tag apparatus which incorporates omni-directional antennas described in the U.S. patent application No. 08/068,682, now U.S. Pat. No. 5,485,166, entitled AN EFFICIENT ELECTRICALLY SMALL LOOP ANTENNA WITH A PLANAR BASE ELEMENT. The present invention also employs interrogators having a plurality of antennae thus providing spatial and polarization diversity. These antenna may each be separately engaged for transmission and reception, and in addition, the tag signal strength as received by each antenna separately is monitored and recorded, thus providing an indication of the optimum antenna orientation for communication. This combination of omni-directional tag antennas and interrogator antenna diversity ensures efficient, effective communications. In the preferred embodiment a typical useable range extends beyond one hundred meters.

The foregoing and other objects, features and advantages of the invention will be apparent from the following detailed description in conjunction with the drawings.

DESCRIPTION OF THE PREFERRED EMBODIMENTS

Figure 1:
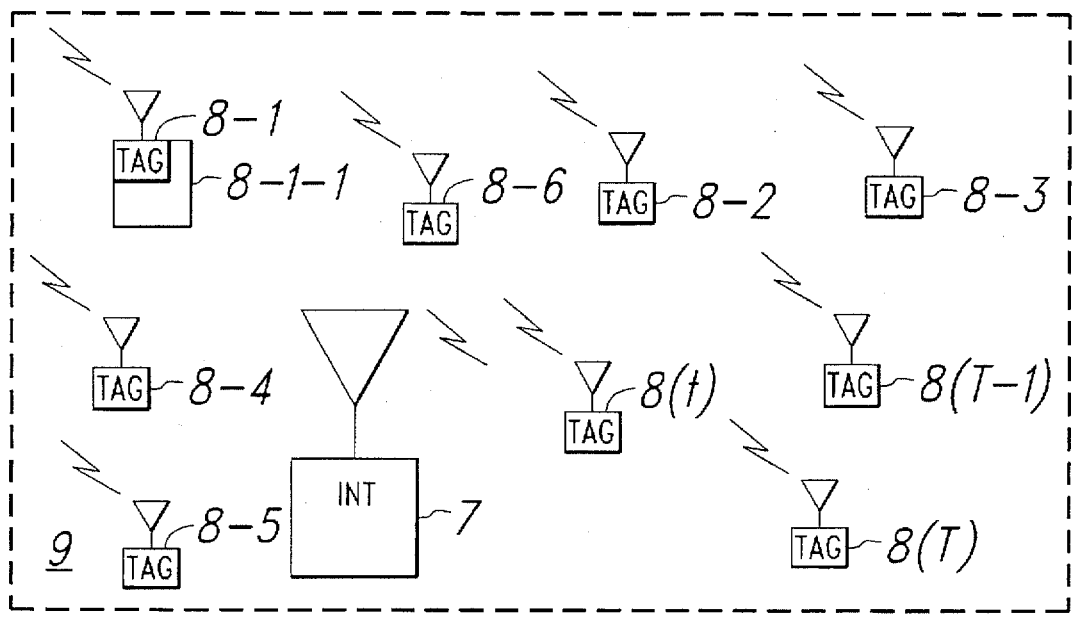
FIG. 1 depicts a communication region formed of one cell in which an interrogator communicates with a plurality of tags.

FIG. 1—Communication System

In FIG. 1, a communication region is shown as a single cell 9 that includes a plurality T of tags 8-1, 8-2, . . . , 8-(t), . . . , 8-(T-1), 8-(T) that communicate with the interrogator 7. The interrogator 7 and the tags 8 form a communication system that operates in the communication region of cell 9. The communication region in typical embodiments is enclosed within a radius of less than one mile from the interrogator 7 and typically contains 50 to 1000 of the tags 8. Each of the tags 8 transmits and receives communications to and from the interrogator 7 and interrogator 7 also transmits and receives communications to and from the tags 8. The cell 9 contains items and each item typically has a tag 8 attached by adhesive, clip or other convenient binder so that locating, tracking, identifying or communicating with a tag is the same as locating, tracking, identifying or communicating with the attached item. For purposes of illustration, the tag 8-1 of FIG. 1 is associated with the item 8-1-1 of FIG. 1. Each of the other tags 8 is similarly associated with items which for clarity are not shown.

Many types of transmitters and receivers (sometimes called "transmitters/receivers" or "transceivers") can be used for the tags 8 and the interrogator 7. Such devices can employ infrared, acoustic, radio frequency, optical or magnetic means and the communication medium may be wire, optical fiber or air. In preferred embodiments, very high frequency (VHF) radio frequency is used in an air communication medium so that the transmitter power, antenna size requirements and device range capability are satisfactory for local communication ranges suitable for warehouses, buildings, vehicles and other similar local regions.

Figure 2:
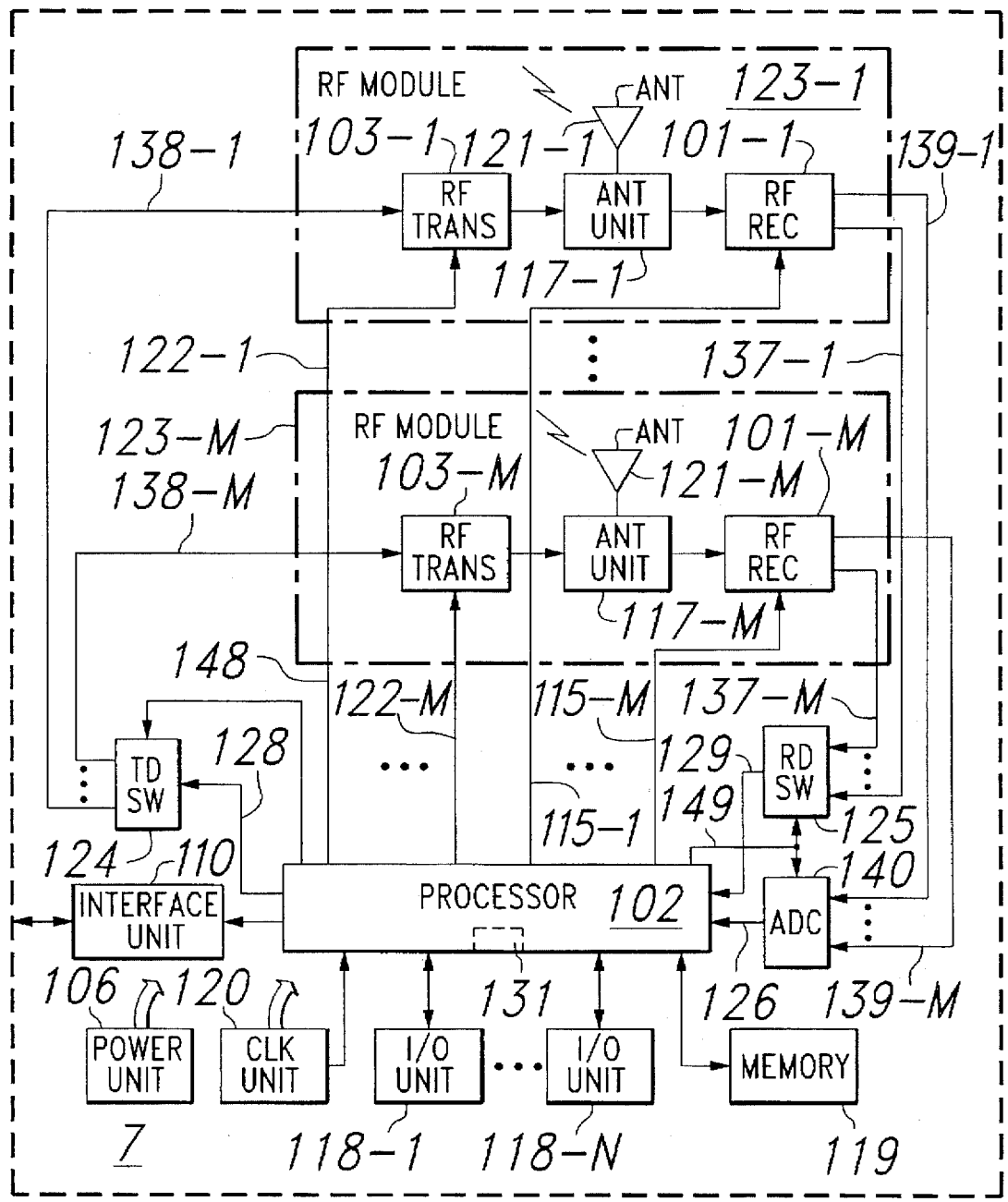
FIG. 2 depicts a block diagram of a typical interrogator.

FIG. 2—Interrogator

In FIG. 2, further details of the interrogator 7 of FIG. 1 are shown. The interrogator 7 includes one or more radio frequency (RF) transmitter/receiver (transceiver) modules 123, particularly, the RF modules 123-1, . . . , 123-M. Typically, the value of M is 2 or 3 so that interrogator 7 typically includes 2 or 3 RF modules 123. The interrogator 7 includes an interrogator processor 102 for processing commands from an interrogator command set. The interrogator RF modules 123 connect to interrogator processor 102 for sending and receiving communications to and from tags 8 of FIG. 1 including tag commands, synchronizing signals and acknowledge signals. The processor 102 together with the synchronizing code stored in memory 131 is a synchronizing means for communications with tags 8.

RF module 123 contains RF transmitter 103, which is a respective one of frequency modulating RF transmitters 103-1, . . . , 103-M, and contains RF receiver 101, which is a respective one of RF receivers 101-1, . . . , 101-M. RF receiver 101 is typically a conventional superheterodyne receiver or other similar receiver.

The power to the RF modules 123-1, . . . , 123-M and other components of the interrogator of FIG. 2 is from the power unit 106. The power states of the RF transmitters 103-1, . . . , 103-M are controlled by control lines 122-1, . . . , 122-M, respectively. The power states of RF receivers 101-1, . . . , 101-M are controlled by control lines 115-1, . . . , 115-M, respectively. The control lines 122-1, . . . , 122-M and 115-1, . . . , 115-M are controlled by processor 102 by means of which the processor 102 has control over the receive and transmit functions of RF modules 123-1, . . . , 123-M, respectively.

RF module 123 contains an antenna unit 117 which is a respective one of the antenna units 117-1, . . . , 117-M. Antenna unit 117 is typically a diode network that is responsive to the power states of RF transmitter 103 and RF receiver 101 and functions automatically to connect RF transmitter 103 to antenna 121 which is a respective one of the antennas 121-1, . . . 121-M for transmission of RF signals to the tags 8 of FIG. 1 or to connect antenna 121 to RF receiver 101 for reception of RF signals from the tags 8.

The RF modules 123-1, . . . , 123-M receive the processor output signals, to be transmitted, on the respective data signal lines 138-1, . . . , 138-M, respectively, from the transmit data switch 124 and provide processor input signals, received from tags 8, to lines 137-1, . . . , 137-M, respectively, which connect as inputs to the receive data switch 125. The RF modules 123-1, . . . , 123-M also provide receive signal strength indications to signal strength indication lines 139-1, . . . , 139-M which connect as inputs to analog-to-digital converter (ADC) 140. The analog-to-digital converter 140, under control of control lines 149 from processor 102, provides a digital representation via input line 126 of the signal strength indications on lines 139-1, . . . , 139-M to processor 102.

The receivers 101, lines 139 and converter 140 are signal strength detector means for detecting the signal strength of the received signals from the tags 8 and providing a signal strength indication to interrogator processor 102.

The transmit data switch 124, under control of processor 102 by control lines 148, switches the data signal 128 from processor 102 to one of data signal lines 138-1, . . . , 138-M. The receive data switch 125, under control of processor 102 by means of control signals on lines 149, switches the data signal lines 137-1, . . . , 137-M from RF receivers 101-1, . . . , 101-M to the data signal line 129 which is input to processor 102.

In the arrangement described, the interrogator processor 102 has independent control of which of the RF modules 123 are to receive power, which of the transmitters 103 in RF modules 123 are to function as transmitters as controlled by lines 122-1, . . . , 122-M and which of the receivers 101 in RF modules 123 are to function as receivers as controlled by lines 115-1, . . . , 115-M.

For example, processor 102 may select RF module 123-1 for the transmission function, in which event, control signals on line 148 from processor 102 configure the transmit data switch 124 to connect the processor data signal line 128 to the data signal line 138-1 for input to RF module 123-1 and control line 122-1 from processor 102 enables RF transmitter 103-1. Similarly, processor 102 may select RF module 123-M for a reception function, in which event control signals on line 149 from processor 102 configure the receive data switch 125 to connect the receiver 101-M data signal line 137-M to the receive data processor input signal line 129 for input to the processor 102 and control line 115-M from processor 102 enables RF receiver 101-M.

In the preferred embodiment, the use of two or more RF modules 123 and associated antennas 121 provides diversity in the transmissions to and from the tags in the FIG. 1 system so as to increase the reliability and robustness of the communication. Although many different types of diversity are possible, the preferred embodiment uses both spatial and polarization diversity.

Each of antennas 121-1, . . . , 121-M is spatially offset from the others and is relatively oriented in a different direction from the others, thus providing both spatial and polarization diversity, respectively. Any one of the tags 8 of FIG. 1 which may have poor reception from one of the antennas 121 of interrogator 7 is apt, because of the spatial and polarization diversity, to have better reception from another one of the antennas 121. Similarly, any one of the antennas 121 of the interrogator 7 having weak reception from one of the tags 8 of FIG. 1 is apt to have stronger reception from other ones of the antennas 121.

The communication protocol may select the optimum one of the RF modules 123 in the interrogator 7 for communication with any particular one of the tags 8. The optimum one is determined by the signal strength through ADC 140 and operation of processor 102. Generally, the optimum RF module for a particular one of tags 8 is the one reporting the highest signal strength.

The processor 102 is any conventional microprocessor having a speed sufficient to process the data and control the functions of interrogator 7. In a preferred embodiment, processor 102 is a Motorola MC68HC05C9, an eight-bit microcontroller having an internal instruction code memory 131. The processor 102 executes interrogator sequencing code stored in the interrogator memory 131 which controls the collection protocol and controls the transmission and reception of information between the interrogator 7 and tags 8 of the system of FIG. 1. The memory 131 also stores tag commands that are to be transmitted to the tags for controlling the operation of the tags.

The interrogator 7 also includes an interface unit 110 connected in a conventional manner to processor 102 functioning to process data communication between processor 102 and computer data processing devices (not shown in FIG. 2) external to interrogator 7. The external devices can be computers such as computer 40 in FIG. 8, directly connected or connected over a network to interface unit 110.

The interrogator 7 also may include I/O units 118-1, ... , 118-N that connect in a conventional manner to the processor 102. The I/O units 118 are optional and can include display units, keyboards or other conventional I/O devices.

Processor 102 is also connected to memory 119. Memory 119 typically stores configuration and other data associated with I/O units 118, associated with other external devices or associated with interface unit 110 connecting to computer 40 of FIG. 7 (not show in FIG. 2). Memory 119 is typically an EEPROM memory. The processor 102 in one embodiment includes both internal memory 131 and external memory 119 that together constitute the interrogator memory. However, the interrogator memory can be either internal or external or can be both as shown.

The interrogator 7 includes a clock unit 120 which provides the timing signals to the processor 102 and other components of the interrogator 7 and may include a time-of-day clock.

FIG. 3—Tag

Figure 3:
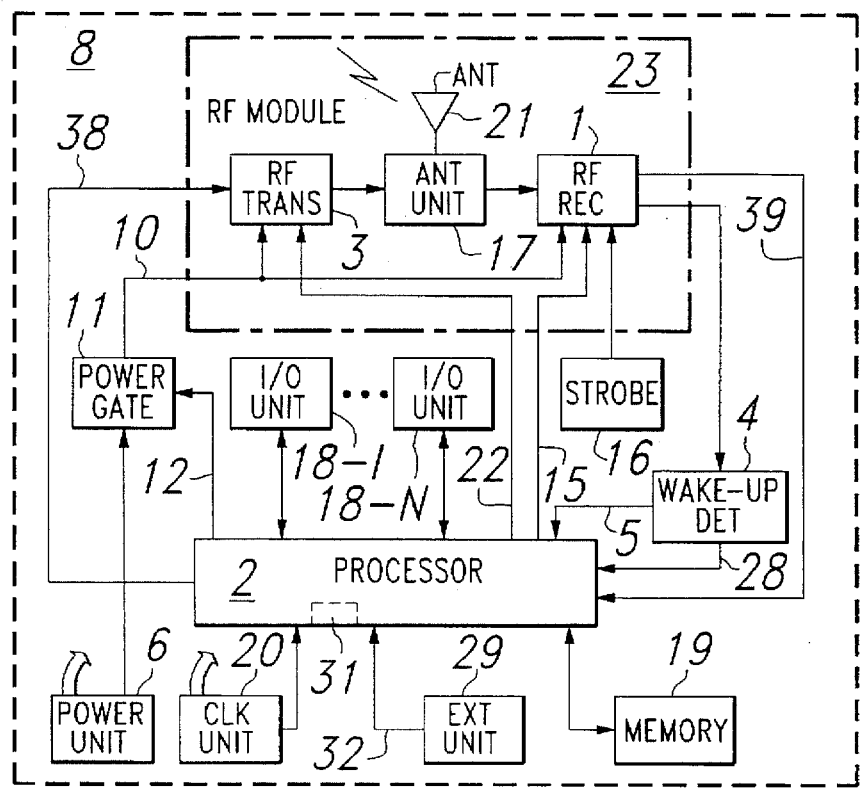
FIG. 3 depicts a block diagram of a typical tag.

In FIG. 3, further details of a typical one of the tags 8 of FIG. 1 are shown. The tag 8 includes a radio frequency (RF) transceiver module 23. RF module 23 contains RF transmitter 3 and RF receiver 1. RF receiver 1 is typically a conventional superheterodyne receiver or other similar receiver.

The RF module 23 receives power lines 10 from the RF controllable power-gate module 11 which is controlled by RF power-gate module control line 12 from processor 2. The power state of the RF transmitter 3 is controlled by control lines 22. The power state of RF receiver 1 is controlled by control lines 15. The control lines 22 and 15 are controlled by processor 2 by means of which the processor 2 has control over the receive and transmit functions of RF module 23. The power unit 6 provides power to the tag transceiver 23 in either the low-power state or the normal-power state as selected by power gate 11.

RF module 23 contains an antenna unit 17 which is a diode network or other circuit responsive to the power states of RF transmitter 3 and RF receiver 1 and functions automatically either to connect RF transmitter 3 to antenna 21 for transmission of RF signals to the interrogator 7 FIG. 1 or to connect antenna 21 to RF receiver 1 for reception of RF signals from the interrogator 7.

The RF module 23 receives the processor output signals to be transmitted on the data signal lines 38 from processor 2 and provides signals received from interrogator 7 to line 37 which connects as a processor input to the processor 2. The RF module 23 also provides received signals on line 39 to a wake-up detector 4. The detector 4 operates to sense the presence of wake-up signals on line 39 that indicate that a communication has been received from the interrogator 7 of FIG. 1.

Antenna 21 is typically an omni-directional antenna for RF communication that provides good sensitivity at multiple signal polarizations. One example of such an antenna that provides excellent sensitivity is disclosed in U.S. patent application No. 08/068,682, entitled AN EFFICIENT ELECTRICALLY SMALL LOOP ANTENNA WITH A PLANAR BASE ELEMENT.

The preferred operation of the tag 8 is to switch to a low-power mode (sleep mode), through operation of the power gate 11, whenever possible so as to conserve the energy of power unit 6. In the preferred embodiment, power unit 6 is a small battery and hence power conservation is important. Prior to entering the sleep state, processor 2 enables the wake-up detector 4 by means of control line 5, to detect any wake-up signal that arrives from the interrogator 7.

The tag 8 includes strobe 16, a conventional pulse generator providing a power strobe signal which is active for a short period (approximately three milliseconds in one preferred embodiment) and inactive for a long period (approximately three seconds in one preferred embodiment). During the sleep state, strobe 16 periodically powers RF receiver 1 to receive any wake-up signals that may be transmitted from the interrogator 7 of FIG. 1. If a wake-up signal is detected, the tag 8 changes to the normal-power mode and prepares for communication with the interrogator 7. If no wake-up signal is detected, the tag 8 remains in the sleep state.

The processor 2 is any conventional microprocessor having a speed sufficient to process the data and control the functions of tag 8. In a preferred embodiment, processor 2 is a Motorola MC68HC05P1 eight-bit microcontroller having an internal instruction code memory 31. The processor 2 executes tag sequencing code stored in the tag memory 31 which controls the transmission and reception of information from the interrogator 7 and participates in the tag collection and other protocols for the system of FIG. 1. The tag processor 2 is connected to the tag transceiver module 23 for processing the tag sequencing code in response to tag commands received by the tag transceiver to send a tag ID to the interrogator transceiver in response to one of the synchronizing signals and responsively to receive one of the acknowledge signals from the interrogator.

Processor 2 includes a reset input 28 connected from wake-up detector 4 to reset the processor 2, causing processor 2 to leave the low-power mode and enter the normal-power mode. Processor 2 also includes an interrupt input 32 connected from external unit 29 to the processor that causes processor 2, in response to an interrupt signal on interrupt input 32, to exit the low-power mode and enter the normal-power mode.

Processor 2 is connected to memory 19. Memory 19 is typically an EEPROM memory, although other memory devices, preferably forms of non-volatile memory (NOVRAM) so as to conserve energy, may be used.

The processor 2 in one embodiment includes both internal memory 31 and external memory 19 that together constitute the tag memory. However, the tag memory can be either internal or external or can be both as shown. The tag memory stores information that may have been received from interrogator 7 of FIG. 1, from external sources by means of the I/O units 18 or from other units. On command from the interrogator 7, the tag may be caused to transmit data from the tag memory to the interrogator 7.

The tag 8 also may include I/O units 18-1, . . . , 18-N that connect in a conventional manner to the processor 2. The I/O units 18 are optional and can include such things as sound devices (beepers), display units, keyboards, temperature sensors, RS232 devices or other conventional and non-conventional I/O devices. In one embodiment, a beeper is included as an I/O device.

Each tag in the system typically has a unique tag ID that distinguishes all tags from each other. The tag ID is typically stored in the tag memory although it may be specified by or included as one of I/O units 18.

The tag 8 includes a clock unit 20 which provides the timing signals to the processor 2 and other components of the tag 8 and may include a time-of-day clock.

The power unit 6 provides the power to all of the components of the tag 8. Typically, the power unit 6 is a battery so that the tag 8 is transportable without the necessity of connection to an external power source although, in some embodiments, other sources of power may be employed.

Figure 4:
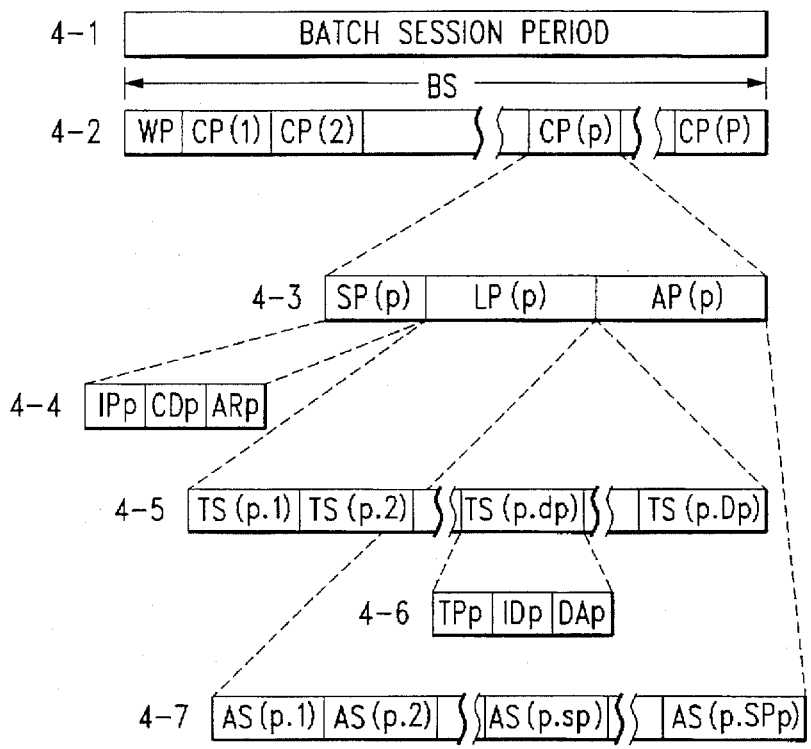
FIG. 4 is a schematic liming diagram of the batch session period for executing the batch collection protocol in the FIG. 1 system.

FIG. 4—Batch Collection Protocol

In FIG. 4, the batch collection protocol is represented. The batch collection protocol is useful, for example, for taking inventory of all tags 8 in the communication region 9 of FIG. 1. The inventory process occurs over a batch session (BS) period 4-1 that includes two way communication between the interrogator 7 and the tags 8.

The batch session BS as indicated in 4-2 of FIG. 4 includes an initial wake-up control period, WP, for waking up the tags and a plurality P of batch collection periods, CP(1), CP(2), . . . , CP(p), . . . , CP(P). In one particular embodiment, the wake-up signal sent by interrogator 7 during the WP period is a 30.5 Khz square wave modulation of the RF carrier sent for a period of 3.492 seconds, this period being longer than the 3 second period of the wake-up signal detect strobe during which the receiver 1 of each of tags 8 is enabled for 3 milliseconds to receive the wake-up signal.

During each batch collection period, a batch of tags that constitute a subset SS of the total set T of tags 8 in the communication region 9 of FIG. 1 successfully communicate with the interrogator 7. Specifically, a first subset of the tags 8 that successfully communicate during collection period CP(1) is designated SS(1). For example, subset SS(1) might include tags 8-4, 8-2, 8-(t) and others of FIG. 1. Some of the tags of FIG. 1 that do not successfully communicate during collection period CP(1), may successfully communicate as one of a second subset SS(2), during collection period CP(2), or may thereafter communicate, as one of a subsequent subset SS(p), that successfully communicates during a subsequent collection period CP(p). The batch collection period CP(P) is the final opportunity for the tags 8 to communicate during a batch session as part of the final subset SS(P). The value of P is selected large enough to ensure that all tags that can communicate will have successfully communicated by the CP(P) collection period. In one embodiment, P has the value of 20. In typical operation, all tags are collected in 5 or less collection periods so that 20 collection periods provides a large safety margin.

In summary, the subsets SS of tags that successfully communicate during collection periods CP are designated SS(1), SS(2), . . . , SS(p), . . . , SS(P) and correspond respectively to collection periods CP(1), CP(2), . . . , CP(p), . . . , CP(P). In a communication system where all tags 8 successfully communicate, the sum of the number of tags in each of the subsets SS(1), SS(2), . . . , SS(p), . . . , SS(P) is equal to the total number T of tags in the communication region.

For the subsets of tags SS(1), SS(2), . . . , SS(p), . . . , SS(P), the corresponding tags that are in the subsets are identified as follows. Subset SS(1) comprises SS1 tags, including tags T(1,1), T(1,2), . . . , T(1,ss1), . . . , T(1,SS1). Subset SS(2) comprises SS2 tags, including tags T(2,1), T(2,2), . . . , T(2,ss2), . . . , T(2,SS2). Subset SS(p) comprises SSp tags, including tags T(p,1), T(p,2), . . . , T(p,ssp), . . . , T(p,SSp). Subset SS(P) comprises SSP tags, including tags T(P,1), T(P,2), . . . , T(P,ssP) . . . , T(P,SSP).

Each collection period CP of batch session 4-2 of FIG. 4 is divided into a synchronization period SP(p), a listen period LP(p) and an acknowledge period AP(p). Thus the collection periods CP(1), CP(2), . . . , CP(p), . . . , CP(P) have synchronization periods SP(1), SP(2), . . . , SP(p), . . . , SP(P), listen periods LP(1), LP(2), . . . , LP(p), . . . , LP(P) and acknowledge periods AP(1), AP(2), . . . , AP(p), . . . , AP(P), respectively. A typical collection period CP(p) having a synchronization period SP(p), a listen period LP(p) and an acknowledge period AP(p) is shown as collection period 4-3 in FIG. 4. In the example described, each listen period LP(p) precedes the acknowledge period AP(p) in the batch collection period CP(p) so that the collection function is separated from the acknowledge function. Each listen period LP(p) is proceeded by a synchronization period SP(p) for synchronizing the tags 8 of FIG. 1 for that collection period.

The synchronization period SP(p) is shown in more detail as 4-4 in FIG. 4. The synchronization period SP(p) includes an interrogator preamble field, IPp, a command field CDp, and an argument field ARp.

The preamble field IPp is sent at the beginning of the synchronization period and consists of, in one example, 12 pulses where 11 of the pulses are of 50 microsecond duration repeated at 125 microsecond intervals. The 12th pulse in the preferred embodiment is 110 microseconds in duration, serving to identify the preamble as being from the interrogator of the preferred embodiment. Other durations of the final or of one or more of the intermediate pulses may be used in alternate embodiments and constitute means to identify the preamble source and therefore the source of the subsequent dam.

The command field CDp and argument field AP, p of 4-4 in FIG. 4, in one particular embodiment, are comprised of 8-bit bytes having 7 bits of code and one bit of parity. The command field CDp defines the command that is sent from an interrogator 7 to the tags 8. The argument field ARp may be associated with a particular command and will comprise differing numbers of bytes corresponding to the command type and may carry the address (ID code) of a tag or other information.

An example of a command instruction set and the corresponding argument fields for the preferred embodiment appear in the following TABLE 1. In TABLE 1, the commands are of two types, namely, one-to-many commands or "broadcast commands" that are commands broadcast for execution by all awake tags and one-to-one commands or "directed commands" that are commands directed to an addressed tag for execution. The HELLO, ALL_SLEEP, and INTERRUPT_HELLO commands are broadcast commands and all other commands are directed commands. Of course, additional broadcast commands or directed commands can be added to TABLE 1 if desired.

The interrogator processor accesses the interrogator memory to process the interrogator sequencing code to first send a broadcast command and subsequently to send a directed command. With this broadcast command and subsequent directed command sequencing, efficient communication between many tags and an interrogator is achieved.

Each tag processor processes the tag sequencing code in response to the broadcast command and the directed command. As part of the sequencing, each tag returns a unique communication to the interrogator including the tag ID.

of the ID codes from all tags within range of the interrogator. The HELLO and SET_WINDOW commands instruct all tags to report their tag ID's to the interrogator and to subsequently resume the sleep (low-power) state. These broadcast commands are examples of one-to-many command operations, that is, communication from one interrogator to many tags. The ALL_SLEEP command is a broadcast command that directs all awake tags except the tag identified by the argument field (the argument field includes the tag ID code) to resume the sleep state and directs the identified (addressed) tag to remain enabled to receive a subsequent directed command, for example, a BEEP_ON command. The ALL_SLEEP command is an example of a broadcast one-to-many communication that is typically followed by a one-to-one communication such as BEEP_ON command.

Other commands shown in TABLE 1 are commands directed to a specific addressed tag. For example, the SQUAWK command directs a specific tag to transfer the data from a specific portion of the tag memory to the interrogator.

TABLE 1

| Code | Name | Arguments | Description |
|---|---|---|---|
| 00000000 | HELLO | None | Initiate collection of all awake tags using default listen period. |
| 11000011 | SLEEP | 3 byte ID | Instructs the addressed tag that it has been heard and that it can go to sleep. |
| 11000101 | BEEP_ON | 3 byte ID | Instructs the addressed tag to turn on the audible alarm. Returns: Tag ID plus status code. |
| 11000110 | BEEP_OFF | 3 byte ID | Instructs the addressed tag to turn off the audible alarm. Returns: Tag ID plus status code. |
| 11001001 | PLACE | 3 byte ID + count N + address (M) + N bytes of data + parity byte | Store N bytes in EEPROM of addressed tag starting at addr M. Returns: Tag ID plus status code. |
| 11010010 | SQUAWK | 3 byte ID + counter (N) + address (M) | Retrieve N bytes from addressed tag EEPROM starting at address M. Returns: Tag ID + N bytes of data + parity byte covering the data. |
| 11011011 | ALL_SLEEP | 3 byte ID | Puts all awake tags to sleep except the one with the specified ID. |
| 11001100 | CHECK_IN | 3 byte ID | Instructs the addressed tag to return its ID and status bytes. |
| 10001110 | SET_WINDOW | Byte N | Set listen window in all tags to N times 55 msec. Default N = 1. Command initiates a hello cycle. |
| 11010001 | GET_VERSION | 3 byte ID | Instructs addressed tag to return its ID and version byte. |
| 11010100 | WRITE_PORT_B | 3 byte ID + data byte | Writes a byte to Port B of addressed tag. Returns: Tag ID. |
| 11011001 | READ_PORT_A | 3 byte ID | Reads Port A of addressed tag. Returns: Tag ID + Port A. |
| 00000011 | INTERRUPT_HELLO | None | Hello directed to all tags that have the Int A in the status byte set. Returns: Tag ID. |
| 11011010 | GET_ERROR | 3 byte ID | Get error vector from addressed tag. Returns: Tag ID + error byte. |
| 11011101 | CLR_ERROR | 3 byte ID | Clears the error vector on addressed tag. Returns: Tag ID. |

In FIG. 4 and referring to collection period 4-3 of FIG. 4, the synchronization period SP(p) is followed by a tag command selected from the instruction set of TABLE 1 to command the tags to perform a function. For the inventory function, the HELLO and SET_WINDOW commands are broadcast commands that function to initiate the collection In the inventory function, the synchronization period SP(p) of 4-3 in FIG. 4 is followed by the listen period LP(p) of 4-3. A typical one of listen periods LP(p), shown in further detail in 4-5 of FIG. 4, comprises a plurality Dp of diverse communication periods (time periods) TS which, in the embodiment described, are time periods TS(p,1), TS(p, 2), ..., TS(p,dp), ..., TS(p,Dp). The time period TS(p,dp) is typical and is a time period provided for one tag 8 of FIG. 1 to communicate with the interrogator 7 of FIG. 1. If more than one tag attempts to communicate during a time period such as TS(p,dp), a communication collision may occur that will defeat the successful tag-to-interrogator communication for one or more of the colliding tags.

The communication times of the tags 8 are distributed over the Dp time periods of listen period 4-5 of FIG. 4 so as to reduce the number of collisions that occur. However, in general it may be expected that some tags may not successfully communicate during any particular listen period LP(p). The larger the number Dp of time periods relative to the number T of tags 8 attempting to communicate, the more likely that successful communication occurs during a listen period. The larger the number Dp, however, the longer the time required to take inventory of the tags 8. For battery operated tags, the longer the communication time, the more battery power required. Thus a balance between the number of time periods allocated and the number of tags in the system is required for efficient operation. In actual practice it has been observed that the most efficient operation is attained when the number Dp of time periods is equal to the number T of expected tags.

The algorithms used to determine the distribution of the communication times allocated to tags over the time periods are also important to system operation.

A typical one of the time periods TS(p,dp) is shown in 4-6 of FIG. 4. A communication from a tag during the TS(p,dp) time period includes a tag preamble TPp, a tag identifier IDp, and a data field DAp.

The tag preamble TPp is sent by a tag at the beginning of the time period to which the particular tag has been allocated. In one example, the preamble consists of 12 pulses of which the first 11 are 50 microsecond in duration, repeated at 125 microsecond intervals. The 12th pulse in the preferred embodiment is 70 microseconds in duration, serving to identify the preamble as being from the tag of the preferred embodiment. Other durations of the final or of one or more of the intermediate pulses may be used in alternate embodiments and constitute means to identify the preamble source and therefore the source of the subsequent data.

The tag identifier IDp, in one embodiment, is a 24-bit field comprising 20 ID bits and a 4-bit format field. The format field is used to identify the nature of the tag and/or the nature of data that follows in the data field DAp. The data field may include, for example, status information indicating conditions of the tags such as low battery, audible alarms on or off, interrupt levels or may include information as to the data contained within memory 19 of FIG. 3, the nature of connected I/O devices and other information or data associated with data transfers between the tag 8 and the interrogator 7.

By way of example, referring to FIG. 3, one of the I/O units 18 may be a temperature monitoring device which provides temperatures to the tag 8 to be recorded by the tag for transmission to the interrogator 7 of FIG. 1. In such a case, the nature and format of the data is specified in the format field with any data to be transferred to the interrogator carried in the DAp field. Similarly, if the I/O unit 18 is an RS232 port, such a port and the data format is specified in the format field and the data to be transferred to the interrogator carried in the DAp field. Many different data formats and I/O units are possible in accordance with applications of the present invention.

For each of the plurality SSp tags of subset SS(p) that are successful in communicating as part of the batch collection protocol during the listen period LP(p), an acknowledge signal is sent only once and only during the immediately following acknowledge period, AP(p). Each of the SSp tags of the subset of tags SS(p) is allocated a separate communication channel that, in the embodiment described, is a separate acknowledge time period during the acknowledge period, AP(p). More specifically, during the acknowledge period AP(1), the subset SS(1) has acknowledge signals AS(1,1), AS(1,2),. ..., AS(1,ss1), ..., AS(1,SS1) that correspond to the tags of subset SS(1), namely, tags T(1,1), T(1,2), ..., T(1,ss1), ..., T(1,SS1). During the acknowledge period AP(2), the subset SS(2) has acknowledge signals AS(2,1), AS(2,2), ..., AS(2,ss2), ..., AS(2,SS2) that correspond to the tags of subset SS(2), namely, tags T(2,1), T(2,2), ..., T(2,ss2), ..., T(2,SS2). During the acknowledge period AP(P), the subset SS(P) has acknowledge signals AS(P,1), AS(P,2), ..., AS(P,ssP), ..., AS(P,SSP) that correspond to the tags of subset SS(P), namely, tags T(P,1), T(P,2), ..., T(P,ssP), ..., T(P,SSP).

Figure 5:
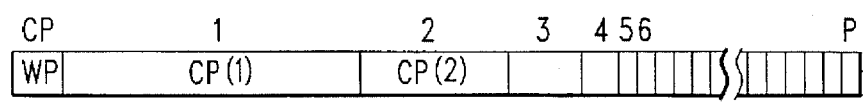
FIG. 5 is a schematic timing diagram showing further detail of the FIG. 4 timing.

FIG. 5—Batch Collection Period Matching

In FIG. 5, further details of the batch session period of FIG. 4 are described. Specifically, the batch session includes the P collection periods CP(1), ..., CP(P). In a preferred embodiment, these collection periods are not all of equal duration and the performance of the collection protocol is enhanced by matching the duration of each of the collection periods to the expected number of tags that are likely to respond during each of the collection periods.

More specifically, in one example of the operation of a batch session, the wake-up command during the wake-up period WP is communicated to all of the tags 8 in the communication region 9 of FIG. 1. All of the tags of region 9 wake up in response to a wake-up signal during the wake-up period, WP, and responsively are programmed to transmit during the listen period LP(1) of FIG. 4-3 on receipt of the synchronization command CD(1) of FIG. 4-4 sent during the synchronization period SP(1) of FIG. 4-3.

The duration of the listen period LP(1) is longer than the duration of subsequent listen periods because it can be expected that the largest number of tags will be attempting to communicate during the collection period CP(1). In one particular embodiment, the duration of listen period LP(1) is made approximately equal to XR times T, where XR is the time required for transmission of a response by a tag, shown as 4-6 of FIG. 4, approximately 6 milliseconds in a preferred embodiment, and T is the total number of tags in the communication region 9 of FIG. 1.

In one example, the T tags 8 have response times distributed, generally randomly, over the listen period LP(1). With such a distribution, it is generally expected that approximately 60% of the tags will successfully communicate without collision with other tags during the CP(1) collection period. These successful tags constitute the subset SS(1).

During CP(1), acknowledge signals are sent to the successfully communicating tags so that the SS(1) subset of tags which successfully communicate during CP(1) do not attempt to communicate during CP(2) and the subsequent collection periods. As indicated in the collection period representation of FIG. 5, the duration of the CP(2) collection period is approximately one-half the duration of CP(I), therefore, the duration of listen period LP(2) is equal to approximately one half of LP(1), the duration of the listen period of CP(1).

During the LP(2) listen period of the collection period CP(2), only approximately 40% of the original T tags attempt to communicate with the interrogator 7 of FIG. 1 since the other approximately 60% were successful during the CP(1) collection period and hence have been removed from further communication. During CP(2), approximately 75% of the remaining tags attempting communication are successful and these tags, designated as the SS(2) subset, are then acknowledged during the AP(2) acknowledge period and are removed as tags that try to communicate with the interrogator in subsequent collection periods. After CP(2), approximately 10% of the T tags remain to communicate.

The CP(3) collection period as indicated in FIG. 5, is once again approximately half as long as CP(2) and the duration of time available for communication in CP(3) is approximately one half of LP(2). During CP(3) about 75% of the remaining tags successfully communicate and are acknowledged, leaving again a still smaller number of the original T tags to be collected.

In a similar manner, one or more of the collection periods CP(4), CP(5) and CP(6) follow, each period contributing a percentage of the remaining tags. Eventually, by the CP(P) collection period, all tags are collected that is, all tags 8 have sent a tag identifier to interrogator 7, have received back an acknowledge signal and have returned to the sleep state. Normal operation of the batch collection process will have collected all tags within a lesser number of collection periods than the limit P. In one preferred embodiment, the limit P is equal to 20, however, it has been observed that typically all tags are collected within 5 or less collection periods.

The example described in connection with FIG. 5 employs one method where a plurality of batch collecting periods CP are each determined to match the collection period bandwidth to the probable number of responding communication tags during each collection period. With such a matching, the whole batch session, including the plurality of collection periods CP(1), ..., CP(P), is efficient in collecting tag communications whereby an inventory of the tags 8 present in the communication region 9 of FIG. 1 is efficiently made.

The method employed is an algorithm in which the bandwidth (control period duration) is reduced for each succeeding collection period down to a minimum collection period and thereafter the collection periods are of constant duration. Of course, other algorithms for matching the collection period bandwidth to the number of transmitting tags may be employed.

In one alternative example, the interrogator may partition the tags into groups based upon unique tag ID's and permit responses only a group at a time. In another alternative example, the interrogator may partition the tags into groups based upon unique tag ID's and permit responses by each group to be over different frequency channels. Each of these alternatives, however, is more expensive than the embodiment described above.

While the size of the subsequent collection periods after the first may be repeatedly reduced in duration, it has been found that continued reductions in duration after a number of initial reductions are not required in that the final collection periods may be set to a fixed, short duration.

While it is possible to lengthen the time duration of each of the collection periods to possibly collect, for example, 100% of the tags in fewer collection periods, in actual practice it has been found that the most effective manner to collect the tags is to use shorter periods and take advantage of diversity of antennae to collect those tags which do not have optimum reception by one of the antennae. This embodiment is described in connection with FIG. 6.

Figure 6:
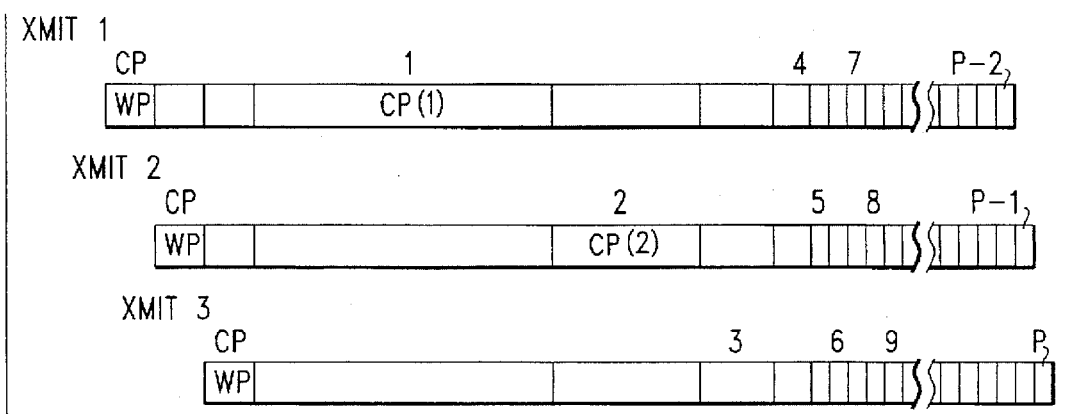
FIG. 6 is a schematic timing diagram showing the FIG. 5 timing in an interrogator having three diverse antennas.

FIG. 6—Batch Collection With Multiple Transmitters

In FIG. 6, further details of a batch session period of the FIG. 5 type are described. The batch session of FIG. 6, like that of FIG. 5 includes the P collection periods CP(1), ... , CP(P). In FIG. 6, like in FIG. 5, these collection periods are not all of equal duration and the performance of the collection protocol is enhanced by matching the duration of each of the collection periods to the expected number of tags that are likely to respond during each of the collection periods.

More specifically, in operation during a batch session of FIG. 6, the FIG. 5 collection periods CP(1), ... , CP(P), are distributed over three different transmitters designated XMIT1, XMIT2 and XMIT3 that correspond to RF modules 123-1, 123-2 and 123-3 of the FIG. 2 type of interrogator 7. Each of the XMIT1, XMIT2 and XMIT3 transmitters issues a wake-up command during the wake-up period WP and each command is communicated to all of the tags 8 within the communication region 9 of FIG. 1, for example. The FIG. 6 embodiment uses the diversity of plural transmitters to enhance the probability that all tags 8 within the region 9 will have a successful communication with the interrogator 7.

All of the tags in region 9 wake-up in response to one of the wake-up signals from the XMIT1, XMIT2 and XMIT3 transmitters during the wake-up period, WP, and responsively are programmed to transmit during the listen period LP(1) of collection period CP(1).

The duration of the listen period LP(1) is longer than the duration of subsequent listen periods because it can be expected that the largest number of tags will be attempting to communicate during the collection period CP(1). In one particular embodiment, the duration of listen period LP(1) is made approximately equal to XR times T, where XR is the time required for transmission of a response by a tag, shown as 4-6 of FIG. 4, approximately 6 milliseconds in a preferred embodiment, and T is the total number of tags in the communication region 9 of FIG. 1.

In one example, the T tags 8 have response times distributed, generally randomly, over the listen period LP(1). With such a distribution, it is generally expected that approximately 60% of the tags will successfully communicate without collision with other tags during the CP(1) collection period. These successful tags constitute the subset SS(1). Communication during the CP(1) collection period is performed, for example, with the antenna for XMIT1.

During CP(1), acknowledge signals are sent using the antenna for XMIT1 to the successfully communicating tags so that the SS(1) subset of tags which successfully communicated during CP(1) do not attempt to communicate during CP(2) and the subsequent collection periods.

As indicated in the collection period representation of FIG. 6, the duration of the CP(2) collection period is approximately one-half the duration of CP(1). Therefore, the duration of listen period LP(2) is equal to approximately one half of LP(1), the duration of the listen period of CP(1). The CP(2) collection period is distributed to the second antenna XMIT2.

During the LP(2) listen period of the collection period CP(2), only approximately 40% of the original T tags attempt to communicate with the interrogator 7 of FIG. 1 since the other approximately 60% were successful during the CP(1) collection period and hence have been removed from further communication. During CP(2), approximately 75% of the remaining tags attempting communication are successful and these tags, designated as the SS(2) subset, are then acknowledged during the AP(2) acknowledge period and are removed as tags that try to communicate with the interrogator in subsequent collection periods. After CP(2), approximately 10% of the T tags remain to communicate.

The CP(3) collection period as indicated in FIG. 6, is once again approximately half as long as CP(2) and the duration of time available for communication in CP(3) is approximately one half of LP(2). The CP(3) collection period is distributed to the third antenna XMIT3. During CP(3) about 75% of the remaining tags successfully communicate and are acknowledged, leaving again a still smaller number of the original T tags to be collected.

In a similar manner, one or more of the collection periods CP(4), CP(5) and CP(6) follow, each period contributing a percentage of the remaining tags. The CP(4), CP(5)and CP(6) collection periods are distributed to the antennas XMIT1, XMIT2 and XMIT3, respectively. Eventually, by the CP(P) collection period, all tags are collected that is, all tags 8 have sent a tag identifier to interrogator 7 and have received back an acknowledge signal. Normal operation of the batch collection process will have collected all tags within a lesser number of collection periods than the limit P. In the preferred embodiment, the limit P is equal to 20, however, it has been found that typically all tags are collected within 5 or less collection periods.

While it has been found that the number of collection periods typically required is 5 or less, a greater number of collection periods are provided (20 in one example) in order to increase the probability that no tags are missed. Furthermore, the collection process is dynamic and changes as a function of the number of tags in the collection region, the number of collection periods employed, the duration of each collection period and the algorithm for changing the duration of the collection periods during any particular session. In general, the greater the number of tags for any sixth duration of a collection period, the greater the probability that a collision occurs. The more collisions that occur, the greater the number of collection periods that will generally be required. Alternatively, if the number of tags remains constant, and the collection period duration is expanded, the fewer the number of collisions that are likely to occur and hence the fewer the number of collection periods required to collect all tags.

In addition to the above factors, other factors such as weak signals from tags in the collection region may also affect the probability of successful interrogator tag communications. If a particular tag is communicating very weakly with an interrogator, it may be that the communication is unsuccessful in one collection period but will be successful in a subsequent collection period even though the poor communication is not the result of a collision. Many factors can interfere with communications between tags and interrogators. In the preferred embodiment described, it has been found that six mandatory collection periods of decreasing collection period duration followed by three uniform short collection periods is typically adequate to collect all tags. However, if after such nine collection periods tags are still being collected, then the system continues to try to communicate for an additional 11 collection periods. It has been found that occasionally tags that were missed during the initial 9 collection periods are collected during one or more of the subsequent 11 collection periods. While these parameters have been found to be very successful in collecting tags, it will of course be realized that all of the parameters can be modified to match the bandwidth parameters whereby efficient collection occurs.

While it is possible to lengthen the time duration of each of the collection periods to possibly collect, for example, 100% of the tags in fewer collection periods, in actual practice it has been found that the most effective manner to collect the tags is to use shorter periods as embodied and to use the diversity of antennae to advantage so as to collect those tags which do not have optimum reception to one of the antennae.

Figure 7:
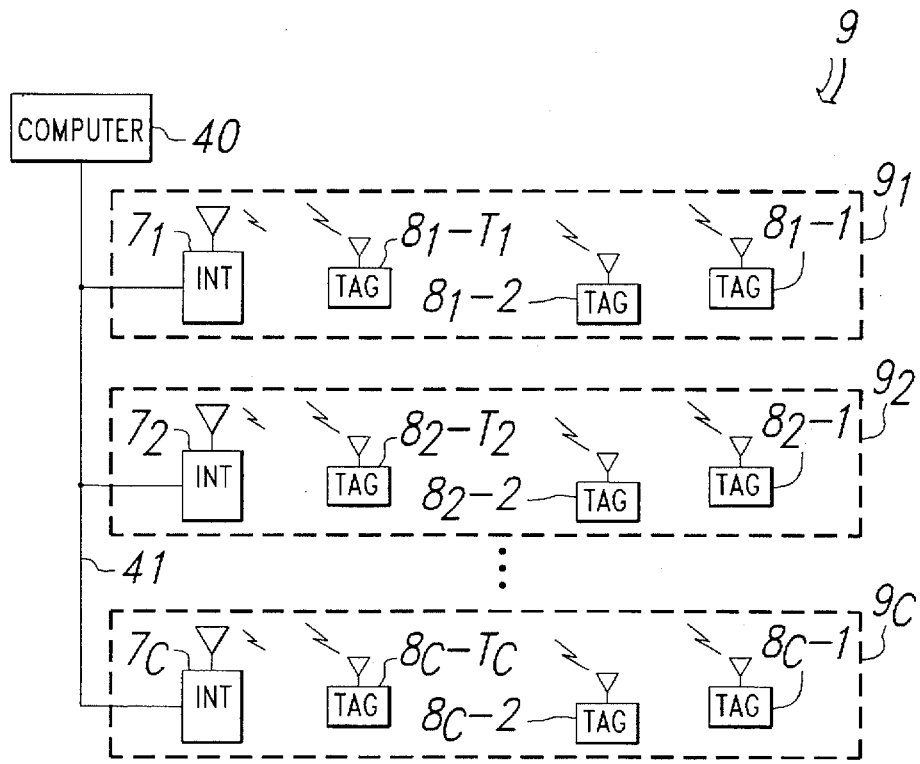
FIG. 7 depicts a communication region formed of a plurality of cells, where each cell has an interrogator that communicates with a plurality of tags.

FIG. 7—Multiple Cells

Referring to FIG. 7, a multi-cell communication system, a cellular communication system, is shown with a plurality of cell regions $9_1, 9_2, \ldots, 9_C$ forming a composite region 9 as distinguished from the single cell system of FIG. 1. In FIG. 7, multiple interrogators 7 including interrogators $7_1, 7_2, \ldots, 7_C$, are positioned and connected in a computer network to create a cellular communication system. A plurality C of cells $9_1, 9_2, \ldots, 9_C$ are present where each cell contains a plurality T of tags 8 and at least one of at least a plurality C of interrogators 7. Specifically, cell $9_1$ includes tags $8_1\text{-}1, \ldots, 8_1\text{-}T_1$, cell 92 includes tags $8_2\text{-}1, \ldots, 8_2\text{-}T_2$, and cell $9_C$ includes tags $8_C\text{-}1, \ldots, 8_C\text{-}T_C$. Interrogators $7_1, \ldots, 7_C$, located respectively in cells $9_1, \ldots, 9_C$, communicate with a computer 40 via a network 41 of conventional design (wired-line, optical-fiber, radio-link, and so on), and also with all of the radio tags located within the communication cell 9 associated with that interrogator 7. The boundary of each of the cells 9 may correspond to the communication range of the interrogators 7 respectively.

An array of these interrogator communication cells $9_1, 9_2, \ldots, 9_c$ form a composite region 9 and are sequenced by the computer 40 to provide cellular communication system for communicating with all of the tags 8 located in the composite region 9. When each of the interrogators $7_1, 7_2, \ldots, 7_c$ has collected all tags in its corresponding region $9_1, 9_2, \ldots, 9_c$, the identification code of each tag, along with the strength of the tag signal, is communicated to the host computer 40, thereby identifying not only all the tags 8, but some information about the location of all tags as well.

While the communication cells $9_1, 9_2, \ldots, 9_C$ of FIG. 7 may be contiguous or overlapping so as to completely cover a building, a ship or other similar contiguous region, they may also be non-contiguous such as one cell per truck where the trucks are in different cities or other non-contiguous locations.

When the cells are in close proximity, the signal strength and the optimum antenna information provided for each tag by the interrogator allows computer 40, utilizing location algorithms, to determine each tag's location.

Each interrogator 7 in FIG. 7, receives signals from the tags 8 at each of the plurality of the separate interrogator antennas 121-1, ..., 121-M as described in connection with FIG. 2. The physical location and orientation of each of tags 8, the diverse antenna orientation, the signal path of the communication between the tag 8 and the interrogator 7 and surfaces of reflection in the local environment will each affect the strength, field pattern and polarization of the tag signals. In a preferred embodiment, the interrogator selects the optimum antenna for further communication by analyzing the tag signal strength at each antenna within the interrogator.

Figure 8:
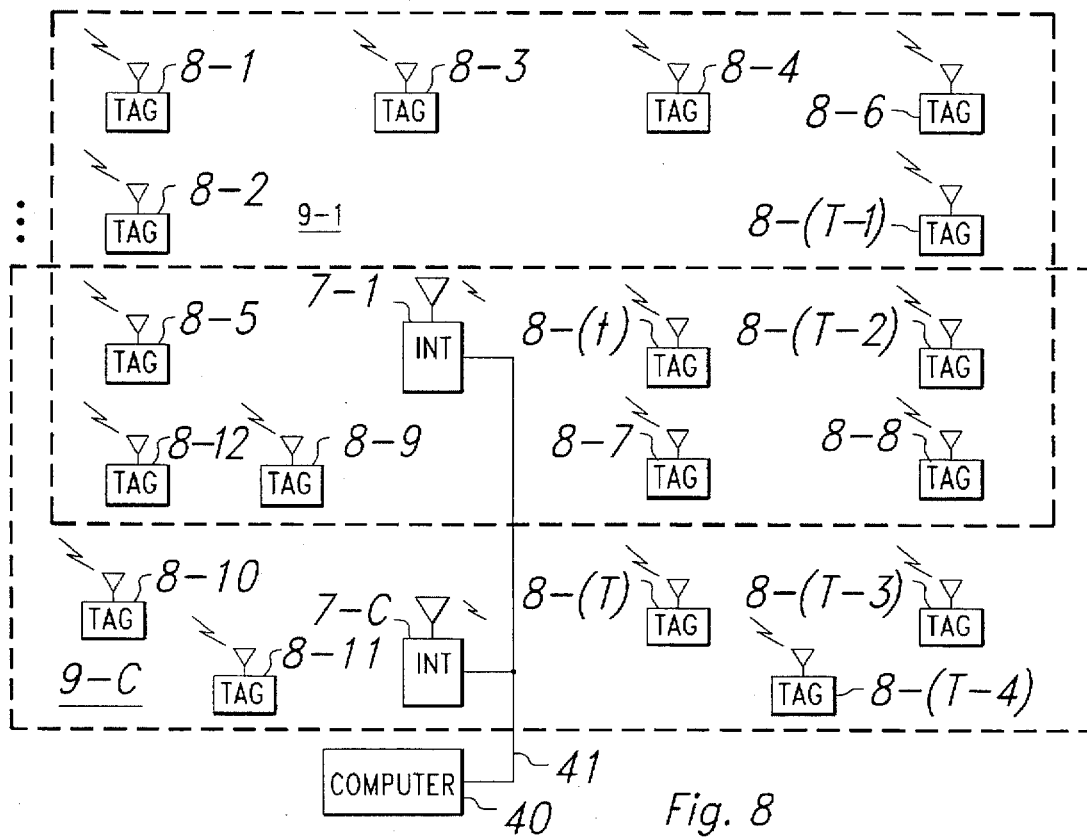
FIG. 8 depicts a communication region formed of two cells in overlapping proximity, where each cell has an interrogator that communicates with a plurality of tags.

FIG. 8—Multiple Contiguous Cells

Referring to FIG. 8, multiple interrogators are positioned and networked to create a cellular identification environment that covers the composite region 9 where region 9 is the union of cells 9-1, ..., 9-C. In FIG. 8, the cellular region 9 includes a plurality C of cells where each cell contains One (of a plurality C) of interrogators 7 and numerous tags 8. Interrogators 7-1, ..., 7-C, located respectively in cells 9-1, ..., 9-C communicate with a computer 40 via a network 41 using conventional connection technology (for example, wired-line, optical fiber, or radio link) and with all of the radio tags located within the communication cell associated with that interrogator.

The limits of the cells 9-1, ..., 9-C correspond with the communication ranges of the interrogators 7-1, ..., 7-C, respectively. An array of the FIG. 8 interrogator communication cells, placed strategically around a facility and appropriately sequenced by the computer 40, provides a communication system for communicating with all of the tags located in the facility. The identification code of each tag, along with the strength of the tag signal and the identity of the antenna receiving the strongest signal, is communicated to the host computer 40, thereby identifying not only the tag, but information about the approximate location of the tag as well.

Each interrogator 7 receives signals from the tags 8 in its respective region at each of the plurality of the separate interrogator antennas 121-1, ..., 121-M. The physical location and orientation of each of tags 8, the diverse antenna orientation, the signal path of the communication between the tag 8 and the interrogator 7 and surfaces of reflection in the local environment will each affect the strength, field pattern and polarization of the tag signal, thus the data provided by the interrogator allows computer 40 to select the optimum antenna for further communication from each interrogator by analyzing the tag signal strength and antenna identity at each interrogator.

The signal strength and the optimum antenna information provided for each tag by the interrogators allow computer 40, utilizing location algorithms, to determine each tag's location.

Figure 9:
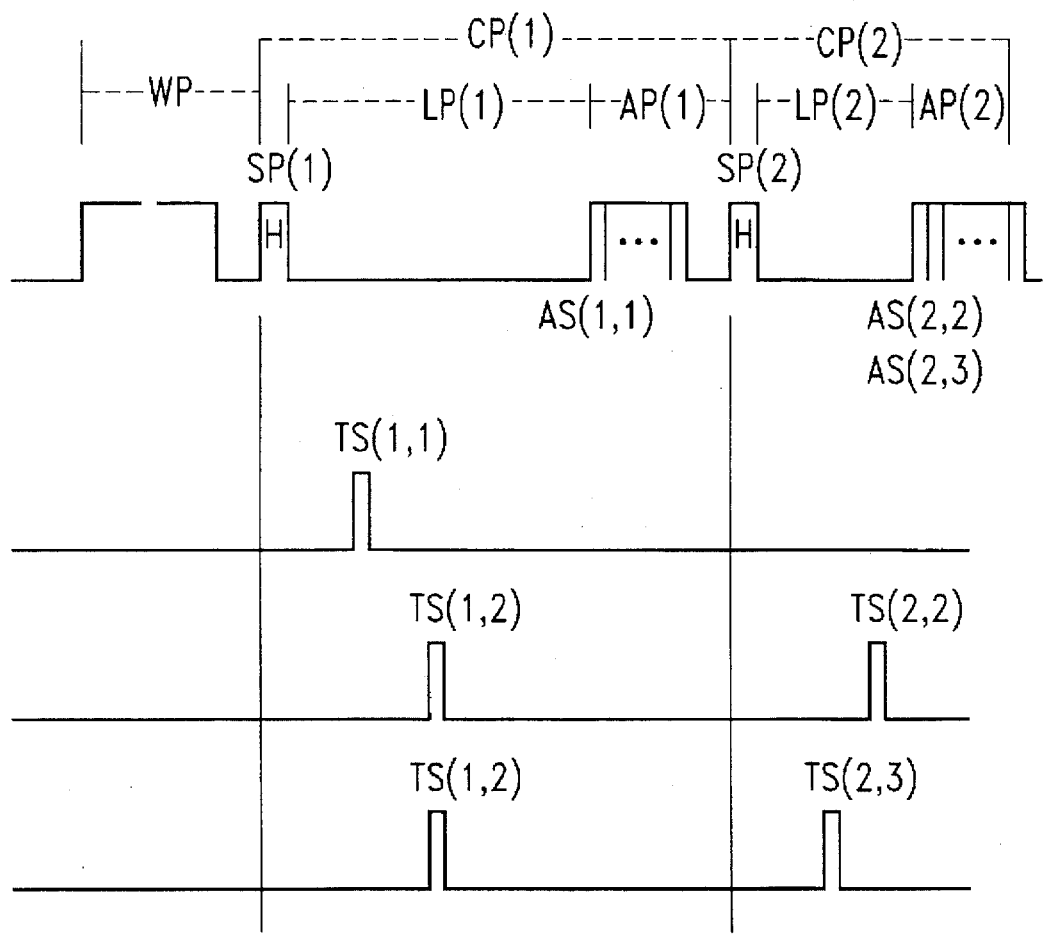
FIG. 9 depicts waveforms representing the batch collection sequence timing, particularly for illustrating the collision resolution technique of the present invention.

FIG. 9—Batch Collection Sequence Timing

The timing and collision resolution of a batch collection process is represented graphically by the waveforms in FIG. 9. The interrogator wakes-up all tags for example tags T(1), T(2) and T(3) (that correspond to tags 8-1, 8-2 and 8-3 of FIG. 1, for example), during the wake-up period, WP, and then begins the collection period CP(1) by sending out a synchronization command H during period SP(1), collects the identity of each tag responding during the listen period LP(1) and acknowledges in acknowledge period AP(1) all tags successfully collected during the listen period LP(1). Tag T(1) sending its tag ID during time period TS(1,1) is representative of the successful tags. Assuming that tags T(2) and T(3) have simultaneously transmitted responses at time TS(1,2) during the listen period LP(1) in such that their transmissions collide and hence are not heard clearly by interrogator, neither tag will receive an acknowledge signal during acknowledge period AP(1). Tags T(2) and T(3) therefore respond again after the subsequent synchronization command H arrives during SP(2).

Listen period LP(1) illustrates the operation of the batch process wherein two tags T(2) and T(3) each respond to the synchronization command during SP(1) in such a manner that a collision results. In the case where thousands of tags are in the region of the interrogator, the response time time-period of two or more tags (with response time time-periods computed based on a tag ID (tag-address) hashing algorithm, for example) might well be the same. Identical or near identical time periods result in a signal overlap or collision that appears as a corrupt signal at the interrogator and the result is that one or both of the colliding signals at TS(1,2) for example, is lost and not received by the interrogator.

The example occurrence shown in FIG. 9, considers the collision case where both signals are lost at time period TS(1,2). Since the interrogator does not acknowledge either of the tags T(2) or T(3) in acknowledge period LP(1), the tags T(2) and T(3) remain in the wait for function loop (see loop $9_2$, 92-1 of LIST 2 hereafter described) waiting for an acknowledge signal. The arrival of the subsequent synchronization command It during SP(2) causes tags T(2) and T(3) to exit the wait loop $9_2$, 92-1 of LIST 2, compute a new random time delay after SP(2) to determine a new response time period at state 94 of LIST 2 and transmit their tag ID identity again during LP(2). This succeeding transmission time during LP(2) occurring after a random time delay for tags T(2) and T(3) thus resolves the time contention of the preceding period LP(1). The tag responses are then sent at the TS(2,2) and TS(2,3) time periods respectively and acknowledged at the time periods AS(2,2) and AS(2,3) in acknowledge period AP(2) without collision.

Two or more different algorithms are used to determine the response time for tags in order to enable efficient use of collection time. In one example, the first algorithm is based on a hashing of tag IDs and the second algorithm is based on random time selection. The hashing algorithm guarantees an even distribution of response times throughout the listen period while the random distribution algorithm does not provide such a guarantee. For the hashing algorithm, more than one tag ID (address) may be hashed to the same time period so that contention will likely result, particularly for large numbers of tags. Therefore, after the first collection period, a random distribution algorithm is employed. The use of a random distribution algorithm for subsequent responses efficiently resolves any contention originally resulting from the ID-based hashing algorithm.

The system also progressively reduces, to a limiting value, the duration of each successive collection period, taking advantage of the fact that fewer tags will remain unacknowledged with each succeeding collection period.

Sequenced Operation of Sessions

LIST 1, LIST 2, LIST 3 and LIST 4 are tables representing the sequence operation of communication sessions executed by an interrogator 7 and tags 8. The TAG INVENTORY session and the POLL TAGS sessions executed by LIST 1 and LIST 2 are two examples of the sessions and each of these sessions employ the batch collection protocol. The TAG INVENTORY session is initiated by the interrogator to wake-up and identify each tag that is within the communication region.

The POLL TAGS session is initiated by the interrogator to identify each tag that is awake in the communication region where the tag has been awakened through initiation of the tag rather than the interrogator. This process occurs when the interrupt input 32 of FIG. 3 is activated by the external unit 29 of FIG. 3. The TAG INVENTORY session and the POLL TAGS sessions are examples and many other sessions are possible.

LIST 3 is an example of a one-to-many followed by a one-to-one communication where the interrogator and tag function to execute a particular one of the commands of TABLE 1 to energize a beeper in a particular tag, although similar processing may be executed for other commands. LIST 3 is representative of the general processing for many different commands of which the beeping function is but one example.

LIST 4 in conjunction with FIG. 8 is representative of the sequencing of the interrogator and tag processing wherein the computer 40 employs the batch collection process with tag location algorithms for determining the location of a particular one of tags 8 in region 9 using the interrogators 7. The location determination process uses the collection information returned from each of the interrogators 7 in region 9 to determine the location within region 9 of a particular one or more of the tags. The determination is made based on the interrogator identity, the antenna identity and tag signal strength data returned from each of the interrogators.

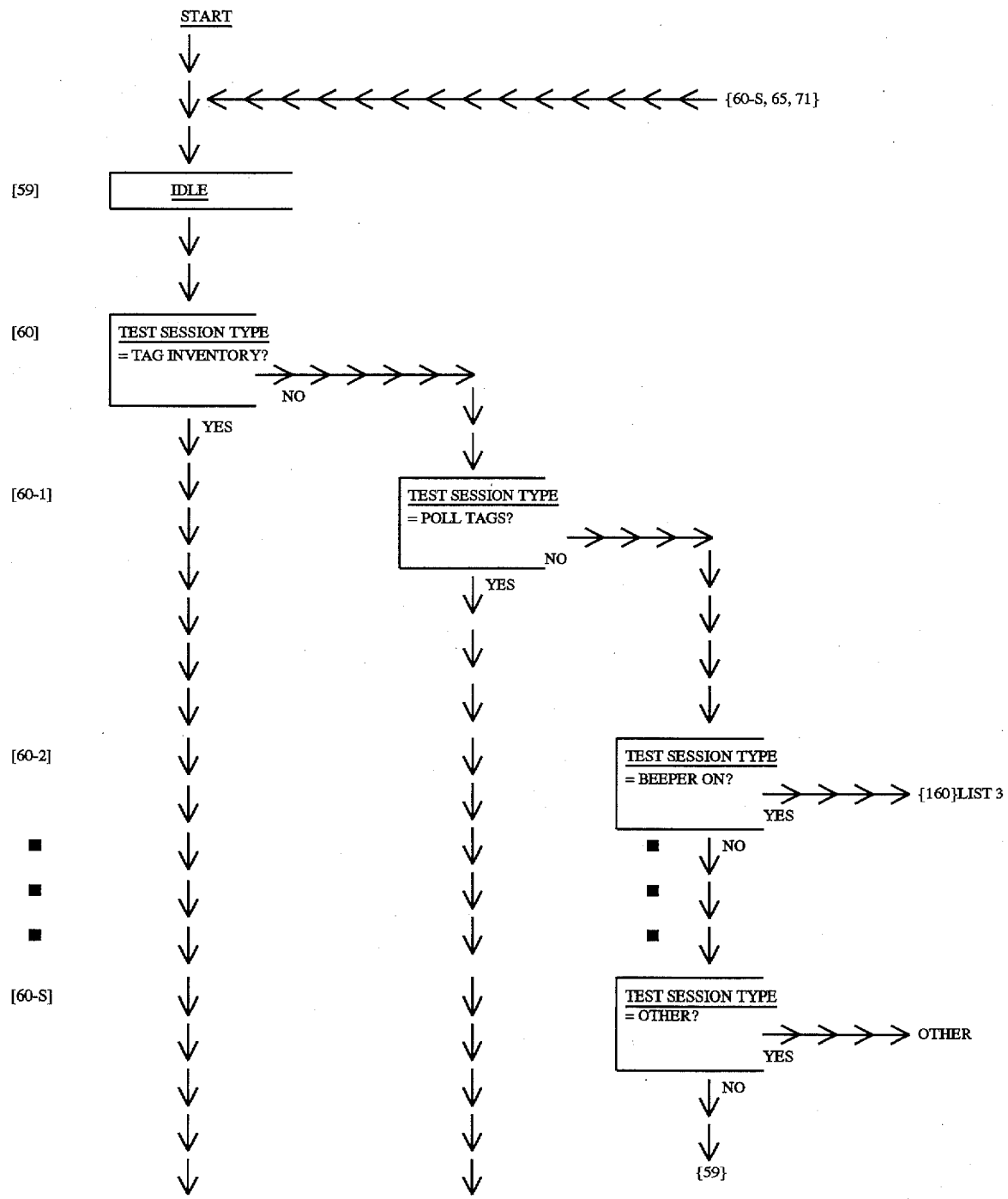

LIST 1 - INTERROGATOR Sequencing

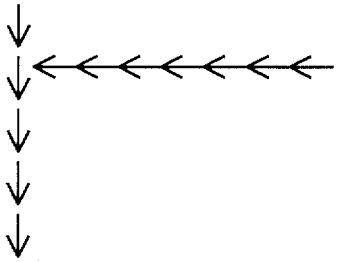

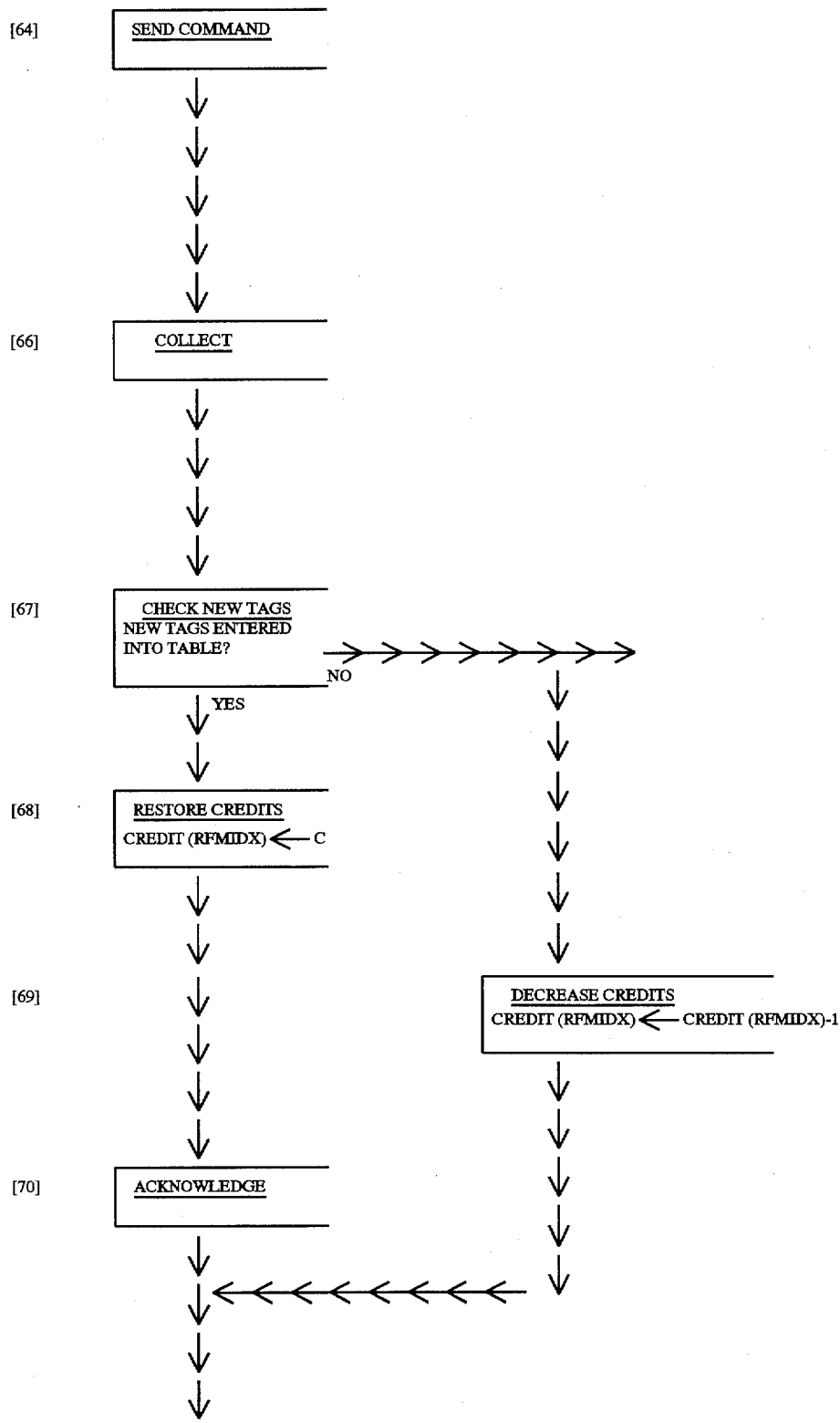

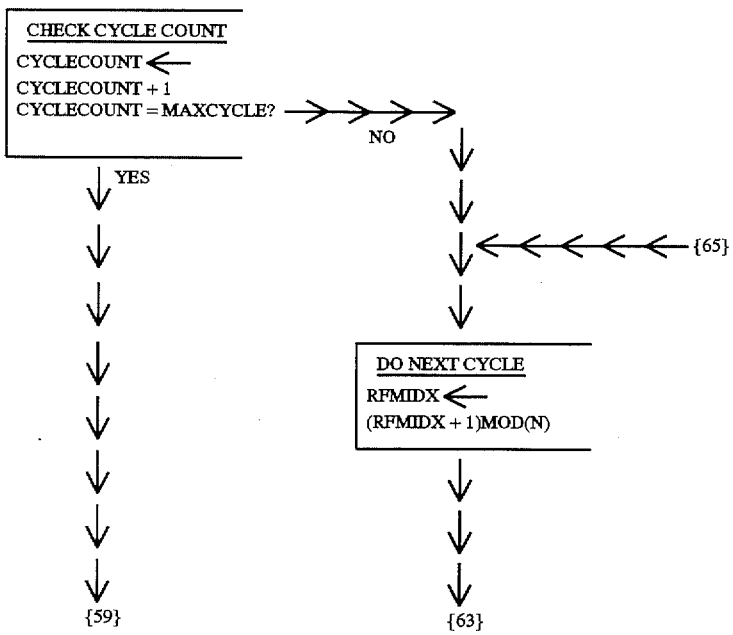
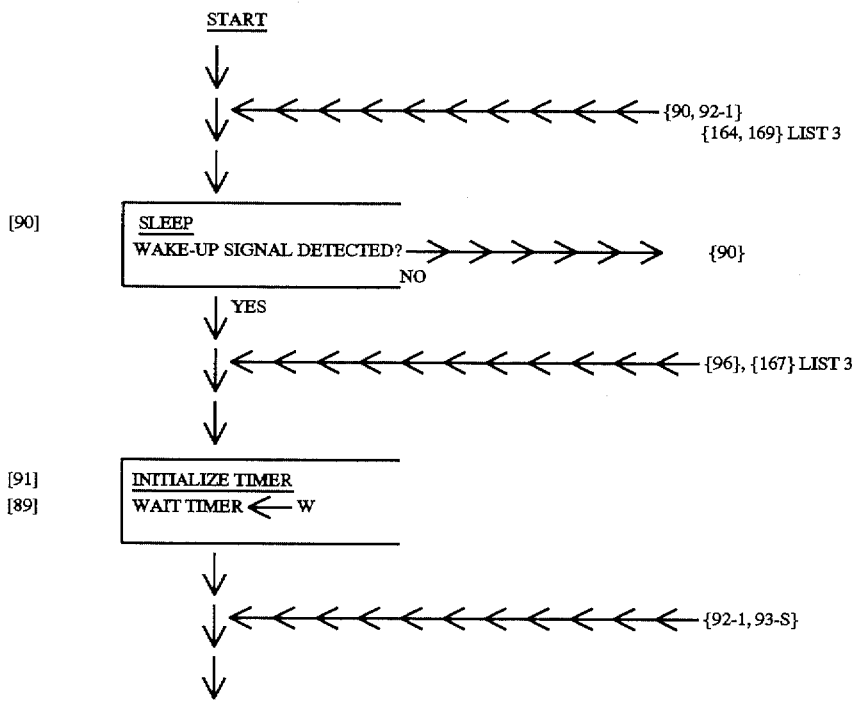
LIST 2 - TAG Sequencing

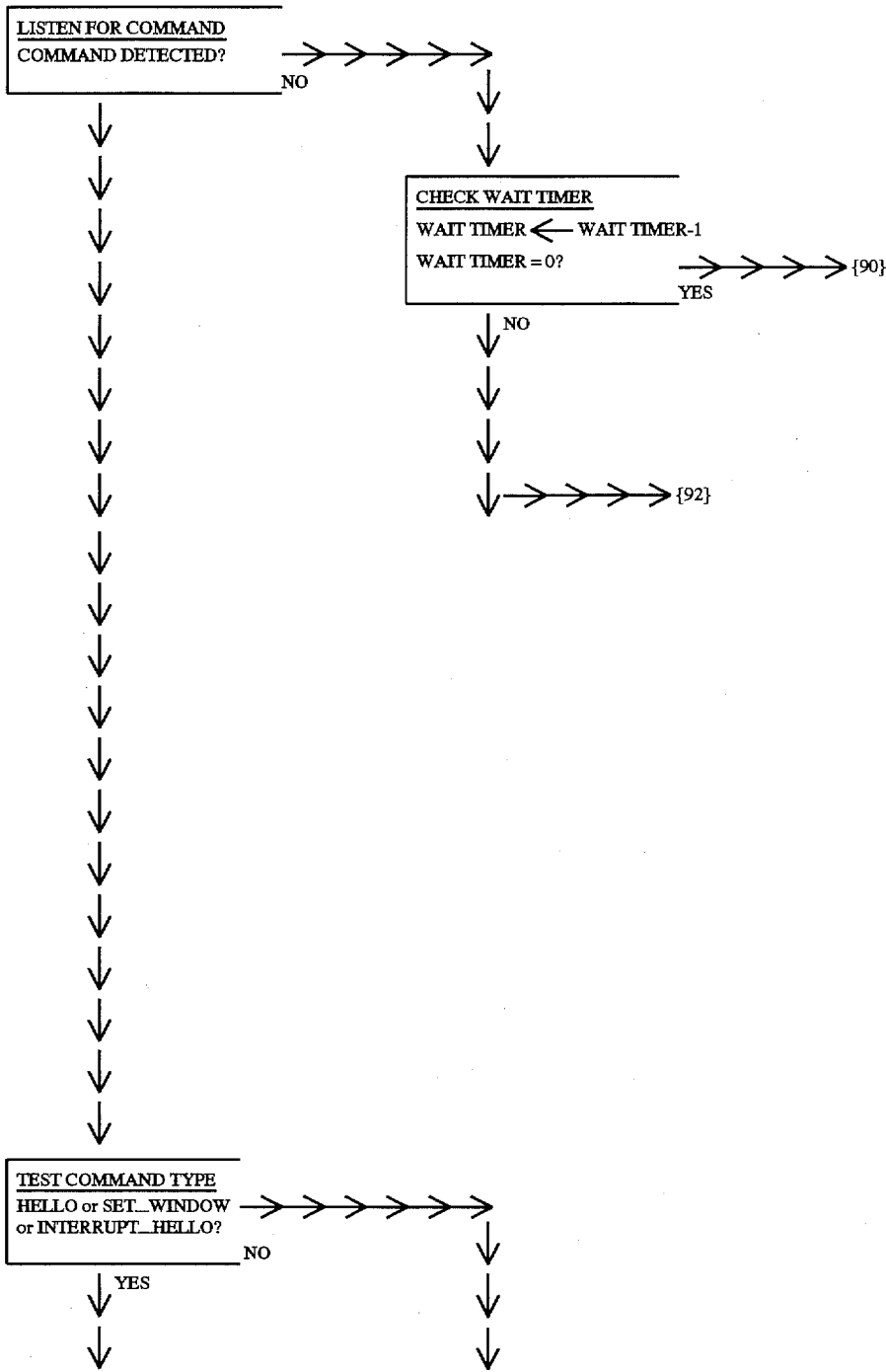

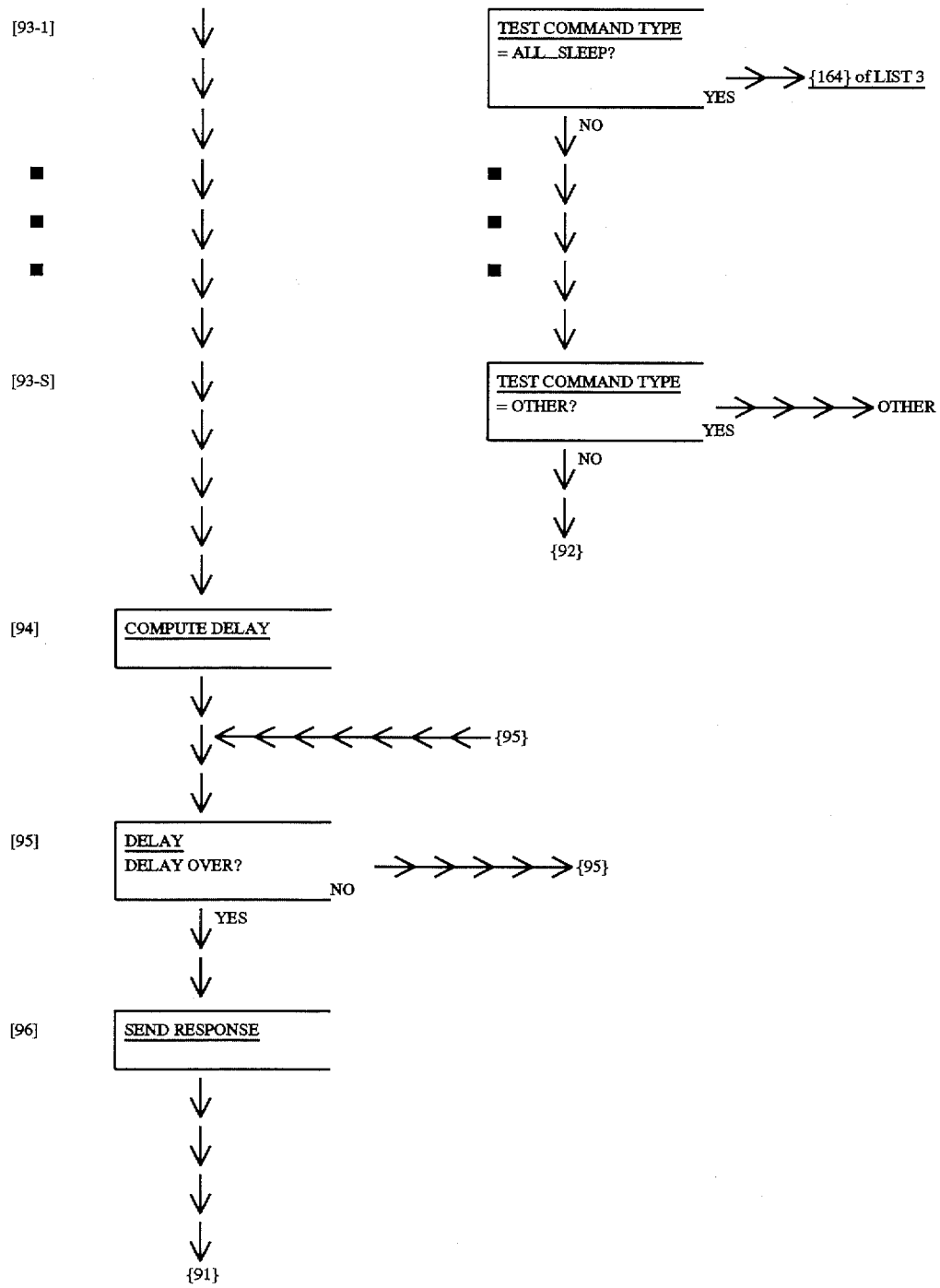
LIST 3 - BEEP_ON Sequencing

-continued
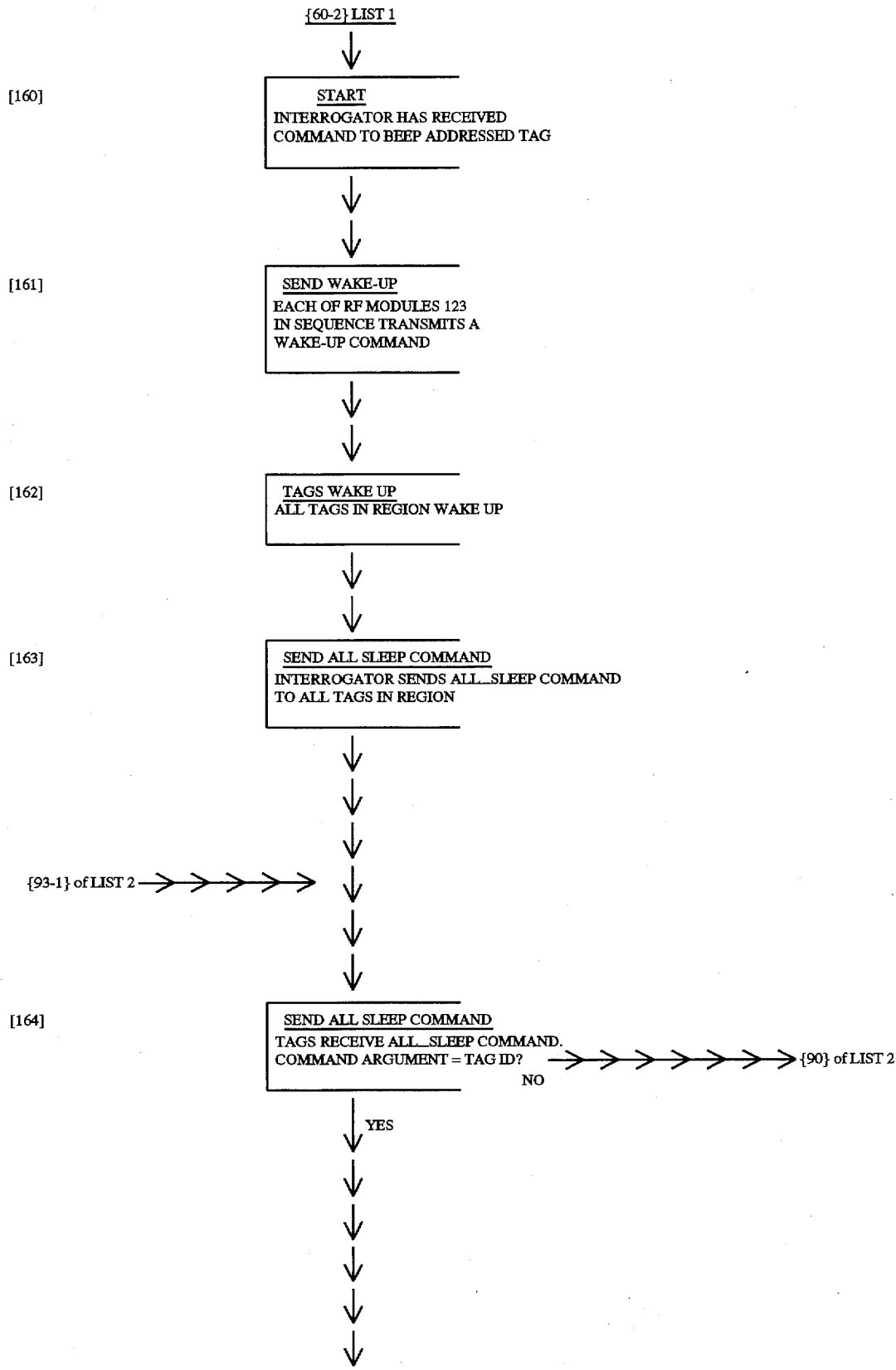

-continued

[165]
SEND BEEP ON COMMAND
INTERROGATOR SENDS BEEP_ON COMMAND TO TURN ON BEEPER OF ADDRESSED TAG

[166]
WAIT FOR STATUS
INTERROGATOR WAITS FOR TAG TO SEND STATUS

[167]
RECEIVE BEEP ON COMMAND
TAG RECEIVES BEEP_ON COMMAND. COMMAND ARGUMENT = TAG ID? ⟶ {91} of LIST 2
NO
↓ YES

[168]
SEND STATUS
TAG SENDS STATUS TO INTERROGATOR

[169]
SET BEEPER ON
TAG SETS BEEPER ON

{90} LIST 2

INTERROGATOR STATE 59. Referring to FIG. 2 and LIST 1, the IDLE state 59 represents the idle state of the interrogator 7. From this state, the interrogator commences different operations that are executed as sessions. The IDLE state is implemented in a conventional manner in the processor 102 of FIG. 2. For example, processor 102 executes an idle loop that branches when an operation, such as tag inventory, is to be started. Tag inventory is one of the significant operations of the invention but many other operations are possible. Other operations include servicing I/O units 118, communicating with tags 8 to enable tag functions, for example, sound generation such as energizing a beeper in a particular tag, or communicating with external systems.

In one preferred embodiment, interface unit 110, connected to computer 40 via network 1 of FIG. 7, initiates the operations to be performed by the interrogator 7. The communication system remains in the idle state until a request from the network 41 initiates a session for performing some operation. Upon receiving a request, the processing in the interrogator 7 passes from IDLE state 59 to TEST SESSION TYPE state 60.

INTERROGATOR STATE 60, 60-1, ..., 60-S. In state 60, interrogator 7 tests to determine the type of session to be executed. State 60 first tests to determine if a TAG INVENTORY operation is to be performed. Assuming a TAG INVENTORY operation is to be performed, a YES result of the test sends the processing to SEND WAKE-UP state 61. Assuming a TAG INVENTORY operation is not to be performed, a NO result of the test sends the processing to the next TEST SESSION TYPE state 60-1.

The TEST SESSION TYPE state 60-1 tests to determine if a POLL TAGS session is to be performed. Assuming a POLL TAGS operation is to be performed, a YES result of the test sends the processing to the INITIALIZE VARIABLES state 62. A NO result of the test sends the processing to the next TEST SESSION TYPE state 60-2.

The TEST SESSION TYPE state 60-2 again is a test for a particular session type. A YES response will send the processing to the particular sequence, a NO response will continue the test for session type. One of the possible sessions is the sequence to activate the beeper in the tag. In the example shown, a BEEPER ON operation is to be performed, hence a YES result of the test sends the processing to LIST 3 state 160. A different required session will return a NO result of the test, sending the processing to the next TEST SESSION TYPE state.

The test session processing continues for any number S of TEST SESSION TYPE tests up to TEST SESSION TYPE state 60-S. While LIST 1 has included serial testing in order to determine the session to be executed, other ways of determining sessions can be employed. For example, condition code branching, vectoring, or table look-up methods can be used.

For purposes of explanation of the batch collection process, assume now that interrogator 7 has received a request for a TAG INVENTORY session from computer 40 via interface unit 110. Processing after leaving the IDLE state 59 advances to TEST SESSION state 60 and then to the SEND WAKE-UP state 61.

Batch Collection Inventory Sessions

Referring to FIGS. 1, 2, and 3 and to LIST 1 and LIST 2, in accordance with the present invention, batch collection and other protocols are one-to-many processes employed during sessions when communication occurs between the interrogator 7 and the tags 8 in an environment where multiple tags may attempt to communicate simultaneously with interrogator 7. The following description applies to the batch collection process as implemented to perform TAG INVENTORY in the preferred embodiment.

INTERROGATOR STATE 61. For TAG INVENTORY using batch collection and for many other sessions, the constant interrogation of all tags within radio range of the interrogator 7 (or other operation requiring high-power consumption by the tags) is not desired. Low-power operation is important for battery-operated tags to extend battery life in the tags. In the present example, it is assumed that all tags normally are in a low-power standby mode (sleep mode) and are awakened and interrogated only as the need arises.

In SEND WAKE-UP state 61, the interrogator transmits a WAKE-UP signal to wake-up sleeping tags. For multiple modules 12-1, ..., 123-N in the interrogator 7, a WAKE-UP signal is sent from each of the RF modules 123-1, ..., 123-N in sequence. In the preferred embodiment, the WAKE-UP signal comprises a VHF radio signal modulated at 30.5 Khz, sent for a period of 3.492 seconds. By using a plurality of RF modules 123 and hence the associated plurality of antennas 121, advantage is taken of the antenna diversity previously discussed, providing to all tags within range the opportunity for optimum reception of the WAKE-UP signal from one of the modules 123. After having sent the plurality of WAKE-L signals as described, the interrogator advances to INITIALIZE VARIABLES state 62.

INTERROGATOR STATE 62. In INITIALIZE VARIABLES state 62 the contents of variable CYCLECOUNT 80 are initialized to 1, the contents of index variable RFMIDX 81 are initialized to 1 and the contents of variable RFM-DONE 82 are initialized to 0. The contents of table TAG TABLE 83 are cleared and the contents of variables CREDIT(1) 84, ..., CREDIT(N) 84+(N−1) are each initialized to a predetermined value C. In the preferred embodiment, the value C equals 3. In the preferred embodiment, the quantity N is equal to 3 and is the number of RF modules installed in the interrogator 7. The interrogator next advances to EXAMINE CREDITS state 63.

TAG STATE 90. Referring now to FIG. 3 and LIST 2, the tags 8 are quiescent in the low-power sleep mode in SLEEP state 90. The strobe 16 functions to cause receiver 1 to sample the ambient radio energy for the duration of the strobe pulse width every strobe period, in the preferred embodiment the sampling is for three milliseconds every three seconds. If the wake-up signal energy is not present, the tag maintains the sleep mode. If the wake-up signal energy is present, the RF receiver 1 and wake-up detector 4 function to activate the processor 2. The processor 2 awakens the tag from its low-power state and the tag advances to INITIALIZE TIMER state 91.

TAG STATE 91. In INITIALIZE TIMER state 91, the tag initializes variable WAIT TIMER 89 to the value W where W has a value of 30 seconds in the preferred embodiment. The tag continues to LISTEN FOR COMMAND state 92.

TAG STATE. 92. In LISTEN FOR COMMAND state 92, the tag checks for the presence of a command from the interrogator. If a command has been received, the tag advances to TEST COMMAND TYPE state 93. If a command is not present, the tag advances to CHECK WAIT TIMER state 92-1.

TAG STATE 92-1. In CHECK WAIT TIMER state 92-1, the variable WAIT TIMER 89 is decreased by one count.

If the variable equals zero, this condition indicates that the tag has not detected a command from the interrogator, most probably because the tag is too distant from the interrogator to detect the command and that therefore there is no reason for the tag to continue listening. The tag branches to SL-P state 90 resuming the sleep mode.

If the variable is greater than zero, this condition indicates that them still exists time for a command to be received and the tag remains in LISTEN FOR COMMAND state 92.

INTERROGATOR STATE 63. Referring to FIG. 2 and LIST 1, the interrogator in EXAMINE CREDITS state 63 examines the variable CREDIT(RFMIDX) 84+(RFMIDX).

If the variable is greater than zero, this condition means either that this is the first time in the current batch collection process that the particular RF module 123-RFMIDX is to be used for communication with the tags or that at least one of the previous N commands for the RF module 123-RFMIDX was successful in collecting tags. In either of these cases, the interrogator advances to SEND COMMAND state 64.

If the variable is equal to zero, that condition means that for N consecutive command transmissions from RF module 123-RFMIDX, no tags have responded in which case the interrogator advances to NEXT RFMODULE state 65.

INTERROGATOR STATE 64. In SEND COMMAND state 64, the interrogator sends a command. In the inventory batch collection process, the command is one of the HELLO or SET_WINDOW commands of TABLE 1 and defines the LISTEN period duration. The duration of the LISTEN period is determined by accessing an army indexed by the contents of variable CYCLECOUNT 80. From the army, the interrogator obtains a value for the duration of the LISTEN period. The array had been preloaded with values related to the number of tags expected in the range of the interrogator, the preloaded values having been installed either at the time of system installation or by computer 40 via network 41. This code together with the processor is bandwidth code and is means for controlling the bandwidth of the collection periods. The bandwidth code sets the bandwidth of each collection period by setting the duration of each of the respective listen periods.

In the preferred embodiments, the maximum one of the values is 6840 milliseconds, with the remaining values decreasing in a manner such that progressive values are approximately one-half the previous value, reaching a limit value of 285 milliseconds. In the preferred embodiments, the array is arranged such that progressively smaller values are loaded at progressively larger index positions in the array. In other embodiments, other values may be used for the LISTEN period durations where such selection of values is dependent on the number of tags expected to be in the range of the interrogator or is determined by the host system after analysis of tag collection statistics.

The interrogator sends a command to all tags using RF module 123-RFMIDX, preferred by a preamble. The preamble in the preferred embodiment is a series of 50 microsecond duration pulses, repeated at 125 microsecond intervals. The preferred data format of commands, and all other data exchanges, is a pulse-width modulated code configured with 90 or 50 microsecond pulses and 35 microsecond spaces. Other preamble and data exchange formats can also be used with the present invention.

After sending a command, the interrogator advances to COLLECT state 66.

INTERROGATOR STATE 65. In NEXT RFMODULE state 65, the variable RFMDONE 82 is increased by one count and compared to the limit N. In the preferred embodiment, N is equal to three, the quantity of RF modules installed in the system.

If the variable is equal to the limit, the interrogator has completed the requisite batch collection periods and is to return to IDLE state 59.

If the variable is less than the limit, the interrogator returns to EXAMINE CREDITS state 63.

TAG STATE 93, 93-1, ..., 93-S. Referring now to FIG. 3 and LIST 2, the tag enters TEST COMMAND TYPE state 93 having detected the receipt of a command. In state 93, the tag tests to determine the type of command that has been received. State 93 first tests to determine if a HELLO or SET_WINDOW command has been received. Assuming a HELLO or SET_WINDOW command has been received, a YES result of the test sends the tag to COMPUTE DELAY state 94. Assuming a HELLO or SET_WINDOW was not received, a NO result of the test sends the processing to the next TEST COMMAND TYPE state 93-1.

The TEST COMMAND TYPE state 93-1 tests to determine if an ALL_SLEEP command has been received. Assuming an ALL_SLEEP command has been received, a YES result of the test sends the processing to RECEIVE SLEEP state 164 of LIST 3. A NO result of the test sends the processing to the next TEST COMMAND TYPE state 93-2.

The test command processing continues for any number S of TEST COMMAND TYPE tests up to TEST COMMAND TYPE state 93-S. While LIST 2 has included serial testing in a certain typical sequence in order to determine the session to be executed, other ways of determining sessions can be employed. For example, different sequences of command testing, condition code branching, vectoring, table look-up or other methods can be used.

For purposes of explaining the batch collection process, it is assumed that tag 8 has received a HELLO or SET_WINDOW broadcast command from the interrogator, in which event, the tag advances to COMPUTE DELAY state 94.

TAG STATE 94. The tag enters COMPUTE DELAY state 94 having detected a HELLO, SET_WINDOW or INTERRUPT_HELLO command. If the command is the SET_WINDOW command, the tag stores the LISTEN time value accompanying the command and then computes a time delay value for the response. If the command is a HELLO or INTERRUPT_HELLO command, the tag computes the time delay value for the response using the default LISTEN time value, in the preferred embodiment the default time value is 285 milliseconds.

On the first SET_WINDOW command received by the tag after the WAKE-UP command, the delay is computed associating the tag address code (tag ID) with the LISTEN duration value. In the preferred embodiment, this association is a hash algorithm manipulation of the tag address (tag ID).

After the first SET_WINDOW command that the tag receives after the WAKE-UP or on receipt of a HELLO or INTERRUPT_HELLO command, the tag chooses a random time delay within the LISTEN time. In the preferred embodiment, the internal clock of the processor 2 of each tag 8 is used as a randomizing element for the tag.

When the delay has been computed as described above, the tag advances to DELAY state 95.

TAG STATE 95. In DELAY state 95, the tag waits its chosen time delay and then advances to SEND RESPONSE state 96.

TAG STATE 96. In SEND RESPONSE state 96, the tag sends its address code (tag ID), prefixed with a preamble, back to the interrogator. The response comprises a preamble, the tag address (ID code) and status code information. The preamble is in the preferred embodiment a series of 50 microsecond duration pulses, repeated at 125 microsecond intervals. The preferred data format of the address, and all other data exchanges, is a pulse-width modulated code configured with 90 or 50 microsecond pulses and 35 microsecond spaces. The tag status code information may include information as to the battery state, beeper state (on or off), interrupt level or other information. Additional data may be sent to the interrogator as data bytes in the format described according to command type as indicated in TABLE 1. The tag then advances to INITIALIZE TIMER state 91 to await further communication from the interrogator.

INTERROGATOR STATE 66. Referring again to FIG. 2 and LIST 1, the interrogator in COLLECT state 66 enables all RF receivers 101 so as to receive tag responses with the maximum diversity possible. When a tag preamble is detected, the interrogator determines the optimum one of the RF modules 123, based on the signal strength from the RF receivers 101 using the ADC converter 140. The interrogator then disables all but the optimum antenna and receives the tag address code, placing the tag code in table TAG TABLE 83 at the position indexed by the tag address. Also placed at the table position is the signal strength indication and other status information. If the data is received in error, the data is discarded. The interrogator enables now all RF modules 123 and again continues in COLLECT state 66, listening for tag response. The interrogator remains in COLLECT state 66 until the LISTEN period expires, at which time the interrogator advances to CHECK NEW TAGS state 67.

INTERROGATOR STATE 67. Referring to FIG. 2 and LIST 1, the interrogator, in CHECK NEW TAGS state 67, examines the table TAG TABLE 83. All tags that respond to the broadcast command sent in SEND COMMAND state 64 will have been entered into table TAG TABLE 83 in COLLECT state 66.

If any additional tags were entered into the table in COLLECT state 66, the interrogator advances to RESTORE CREDITS state 68.

If no additional tags were entered into the table during COLLECT state 66, the interrogator branches to DECREASE CREDITS state 69 wherein the contents, of variable CREDIT(RFMIDX) 84+(RFMIDX-1) is decreased one count. The interrogator then advances to CHECK CYCLE COUNT state 71.

INTERROGATOR STATE 68. In RESTORE CREDITS state 68, the contents of variable CREDIT(RFMIDX) 84+(RFMIDX-1) are initialized to the initial value C to indicate that new tags have responded to transmission from RF module 123-RFMIDX and that collections are to continue using this RF module. The interrogator then advances to ACKNOWLEDGE state 70.

INTERROGATOR STATE 69. In DECREASE CREDITS state 69, no additional tags were entered into the table during the COLLECT state 66. The contents of variable CREDIT(RFMIDX) 84+(RFMIDX-1) are decreased by one. The interrogator then advances to CHECK CYCLE COUNT state 71.

INTERROGATOR STATE 70. In ACKNOWLEDGE state 70, since new tags were entered into the table TAG TABLE 83 during the COLLECT state 66, all such new tags are sequentially each sent an ACKNOWLEDGE command, in the inventory function a directed command, specifically the SLEEP command of TABLE 1. The interrogator then advances to CHECK CYCLE COUNT state 71.

INTERROGATOR STATE 71. The interrogator in CHECK CYCLE COUNT state 71 increases variable CYCLE COUNT 80 by one count. The value of variable CYCLE COUNT 80 is then compared with the limit ENDCYCLE. In the preferred embodiment, ENDCYCLE is equal to 20.

If the variable is equal to the limit, the interrogator has completed the requisite number of batch collection periods. The interrogator returns to IDLE state 59.

If the variable is less than the limit, the interrogator branches to DO NEXT CYCLE state 72.

INTERROGATOR STATE 72. The interrogator in DO NEXT CYCLE state 72 increases the contents of index variable RFMIDX 81 by one count in a modular manner. The modular limit N is equal to the number of RF modules 123 installed in the system, N=3 in the preferred embodiment. The interrogator then returns to EXAMINE CREDITS state 63 to begin another batch collection period of the current batch collection session and processing repeats as previously described.

POLL TAGS Session

Referring again to FIGS. 1, 2, and 3 and to LIST 1 and LIST 2, in accordance with the present invention, batch collection and other protocols are one-to-many processes, employed during sessions when communication occurs between the interrogator 7 and the tags 8 in an environment where multiple tags may attempt to communicate simultaneously with interrogator 7. The following description applies to the batch collection process sequencing to perform a POLL TAGS session in the preferred embodiment.

For a POLL TAGS session, LIST 1 and LIST 2 represent the sequenced operation wherein the communication system polls the tags to determine if any tags are awake and requesting communication with interrogator 7. In one example, tags are awakened in response to an interrupt input 32 from external unit 29 to processor 2 of FIG. 3.

INTERROGATOR STATE 59. Referring to FIG. 2 and LIST 1, the IDLE state 59 represents the idle state of the interrogator 7. From this state, the interrogator 7 commences different operations. Upon receiving a request for a session to perform an operation, the processing in the interrogator passes to TEST SESSION TYPE state 60.

INTERROGATOR STATE 60, 60-1, . . . , 60-S. In state 60, interrogator 7 tests to determine the type of session to be executed. State 60 first tests to determine if a TAG INVENTORY operation is to be performed. Assuming a TAG INVENTORY operation is not to be performed, a NO result of the test sends the processing to the next TEST SESSION TYPE state 60-1.

The TEST SESSION TYPE state 60-1 tests to determine if a POLL TAGS session is to be performed. In this present example, a POLL TAGS operation is to be performed, therefore, a YES result of the test sends the processing to the INITIALIZE VARIABLES state 62.

INTERROGATOR STATE 62. In INITIALIZE VARIABLES state 62, the contents of variable CYCLECOUNT 80 are initialized to 1, the contents of index variable RFMIDX 81 are initialized to 1 and the contents of variable RFMDONE 82 are initialized to 0. The contents of table TAG TABLE 83 are cleared and the contents of variables CREDIT(1) 84, . . . , CREDIT(N) 84+(N-1) are each initialized to a predetermined value C. In the preferred embodiment, the value C equals 3. In the preferred embodiment, the quantity N is equal to 3, the number of RF modules installed in the interrogator. In the same manner as for a TAG INVENTORY session, the interrogator advances to the EXAMINE CREDITS state 63 and then to SEND COMMAND state 64.

TAG STATE 90. Referring now to FIG. 3 and LIST 2, the tags 8 are quiescent in the low-power sleep mode in SLEEP state 90 as previously described. For POLL TAGS and many other sessions, the constant interrogation of all tags within radio range of the interrogator 7 or other operation requiring high-power consumption by the tags is not desired. Low-power operation is important for battery-operated tags. In this present example, it is assumed that all tags normally are in low-power, standby mode (sleep mode), as previously discussed, and are awakened and interrogated only as the need arises as a result of an interrupt to processor 2 of FIG. 3. If the wake-up signal is not present, the tag remains in the sleep mode unless an interrupt signal is present. If the interrupt signal is present, the processor 2 awakens the tag from its sleep state and the tag advances to INITIALIZE TIMER state 91.

TAG STATE 91. In INITIALIZE TIMER state 91, the tag initializes variable WAIT TIMER 89 to the value W, W has a value of 30 seconds in the preferred embodiment. The tag continues to LISTEN FOR COMMAND state 92.

The POLL TAGS process sequencing in the interrogator now sends the INTERRUPT_HELLO command that will cause all tags in the region that are awake to respond in the same manner as for an INVENTORY process. Only those tags awakened by an interrupt as previously described will receive the INTERRUPT_HELLO command. From this time on, the sequencing is the same as previously described in connection with the TAG INVENTORY session, except that the interrogator sends the INTERRUPT_HELLO command instead of SET_WINDOW or HELLO as the interrogator is now using the batch collection protocol to identify all tags that are awake. Since the interrogator did not transmit a wake-up command, the tags are awake under their on initiation by operation of an interrupt signal, for example. The operation described for polling tags is an example of a reverse wake-up operation in which the tag awakens in response to a stimulus. While the stimulus can be via the processor interrupt, the stimulus can also be from an alarm or other signal from one of the attached I/O units 18 of FIG. 2 thereby, in the case of an alarm, embodying a polled remote alarm system. The interrupt stimulus may also be from a switch or other device activated by a person, carrying the tag, as for example, for personal identification.

Turn On Beeper Session

Referring now to LIST 1, LIST 2 and LIST 3 and FIG. 1, FIG. 2 and FIG. 3, an example of a one-to-many followed by a one-to-one communication sequence is shown. In this example, causing a particular one of the tags in the region to execute a function is accomplished by first waking up all tags in the region by executing the wake up sequence, subsequently directing all tags except the desired tag to resume the sleep state and then commanding the desired tag to execute the function. The batch collection protocol is not employed in this sequence as it is necessary only to wake up the tags and command the directed tag to perform the desired action.

The sequence begins with the interrogator sending the WAKE-UP signal to all tags. The interrogator then sends the ALL_SLEEP command of TABLE 1 with the address (tag ID) code of the desired tag as the command argument. The ALL_SLEEP command is a broadcast command directing all tags except the tag identified by the ID code to immediately resume the sleep state. The interrogator follows the ALL_SLEEP command with the BEEP_ON command, a directed command of TABLE 1, again with the address (tag ID) code of the desired tag as the command argument. The tag, on receipt of the BEEP_ON command, transmits back to the interrogator a response code indicating successful receipt of the command and associated information bytes containing the status of the tag. The tag then activates the beeper for a predefined time, in the preferred embodiment three minutes, after which it automatically resumes the sleep state.

In the following discussion of the flow of this process, the states 160 to 169 are operational blocks describing the processing of the BEEPER ON sequence by an interrogator and a plurality of tags. These blocks each incorporate one or more of the states 91 to 96 of LIST 2 which are executed internally within the block being discussed and are not shown in LIST 3 for clarity.

BEEP ON STATE 160. Referring now to LIST 1 and LIST 3, the interrogator in the example has arrived at START state 160 having being commanded to execute a BEEPER ON sequence to energize the beeper of a particular one of a plurality of tags. The address (ID code) of the particular tag has been transmitted to the interrogator by, for example, the external computer 40 of FIG. 7, and has been stored internally in processor 102. The process continues to SEND WAKE UP state 161.

BEEP ON STATE 161. For directed tag communication and for many other types of sessions, the constant operation of all tags within radio range of the interrogator 7 (or other operation requiring high-power consumption by the tags) is not desired. Low-power operation is important for battery-operated tags to extend battery life in the tags. In the present example, it is assumed that all tags normally are in a low-power standby mode (sleep mode) and are awakened only as the need arises.

In SEND WAKE-UP state 161, the interrogator transmits a WAKE-UP signal to wake up sleeping tags in the same manner as described previously for LIST 1 SEND WAKE UP state 61. After having sent the plurality of WAKE-UP signals as described, the process continues to TAGS WAKE UP state 162.

BEEP ON STATE 162. In TAGS WAKE UP state 162, each tag in the region 9, in the sleep mode of SLEEP state 90 of LIST 2, responds to the WAKE_UP signal in the same manner as described previously in LIST 2 and advances to INITIALIZE TIMER state 91 and then to LISTEN FOR COMMAND state 92. The process continues to SEND ALL SLEEP COMMAND state 163.

BEEP ON STATE 163. In SEND ALL SLEEP COMMAND state 163, to conserve battery energy in the plurality of tags, the interrogator transmits an ALL_SLEEP command of TABLE 1 to the plurality of tags, using the address (held in storage in processor 102) of the particular tag whose beeper is to be energized as the argument to the command. The process continues to RECEIVE SLEEP COMMAND state 164.

BEEP ON STATE 164. In RECEIVE SLEEP COMMAND state 164, the tag receives the ALL_SLEEP command from the interrogator. Each tag compares the address (ID code) argument of the command with its own address (ID code). If the result of the compare is FALSE, that is, the particular tag is not being addressed, the tag returns to the sleep mode of SLEEP state 90 of LIST 2. No further action occurs with this particular tag.

If the result of the compare is TRUE, that is, the particular tag is being addressed, the process continues to SEND BEEP ON COMMAND state 165 where the tag awaits a further command from the interrogator.

BEEP ON STATE 165. In SEND BEEP ON COMMAND state 165, the interrogator transmits the BEEP ON command of TABLE 1, using as an argument the address (held in storage in processor 102) of the particular tag to be energized. The process flow continues to WAIT FOR STATUS state 166.

BEEP ON STATE 166. In WAIT FOR STATUS state 166 the interrogator is waiting for the command response from the addressed tag for a period of time which in the preferred embodiment is approximately 114 milliseconds. During this time period, the tag is expected to return an acknowledgement of the command. When the status response is received from the tag, or at the end of the time period if the response from the tag is not received within the time period, the interrogator will set an appropriate status code, send the code to computer 40 and then return to IDLE state 59 of LIST 1. The process flow continues to RECEIVE BEEP ON COMMAND state 167.

BEEP ON STATE 167. In RECEIVE BEEP ON COMMAND state 167, the tag has received the BEEP_ON command and compares the address argument of the command with its own address.

If the comparison result is FALSE, this indicates that the particular tag responded incorrectly to the ALL_SLEEP command of state 163, that is it either did not hear the command correctly or it incorrectly compared the address argument. In either event, on failure to verify the address, the tag returns to the INITIALIZE TIMER state 91 and then to LISTEN FOR COMMAND state 92 to await further commands. Since the interrogator has no knowledge of the state of this tag, that is this tag has remained awake erroneously, the tag will remain in the loop states 92 and 92-1 until the WAIT TIMER equals zero, at which time the tag returns to the sleep mode at SLEEP state 90. In this manner the process functions in a fail safe manner.

If the comparison result is TRUE, the tag has been addressed and the process flow continues to SEND STATUS state 168.

BEEP ON STATE 168. In SEND STATUS state 168, the tag transmits its address ID code and a status byte back to the interrogator. The status byte is of the same format as the response to the HELLO or SET_WINDOW command, that is a preamble followed by an address, and additionally accompanied by the status byte. This transmission is collision free as all other rags are either in the sleep state, having not found a TRUE comparison when the address of the original command was matched as described in state 164 or, previously discussed having erroneously found true the address code, are in the LISTEN FOR COMMAND state 92.

On receipt of the address ID and status information, the interrogator sends the information to the computer 40 and returns to the idle state as discussed in state 166. After transmission of the status information, the process flow continues to SET BEEPER ON state 169.

BEEP ON STATE 169. In SET BEEPER ON state 169, the tag activates the beeper for a predetermined time, in the preferred embodiment three minutes, and then deactivates the beeper. The BEEPER ON function then terminates with the tag advancing to SLEEP state 90 of LIST 2.

Tag Location Algorithms

Referring to LIST 4 and FIG. 8, an example of a session is described in which the computer 40 employs the batch collection process, previously described, together with tag location algorithms for determining the location in FIG. 8 of particular ones of tags 8 in region 9 using the interrogators 7. The location determination uses the collection information returned from each of the interrogators 7 in region 9 to determine the location within region 9 of a particular one or more of the tags. The determination is made based on the interrogator identity, the antenna identity and tag signal strength data returned from each of the interrogators. Such a process is readily repeatable for any of the tags 8 in the region 9 using the command set of TABLE 1.

The LOCATE TAG states 300 to 307 of LIST 4 are shown only as function blocks for clarity. The command sequencing may be discerned by examination of TABLE 1, and of LIST 1, LIST 2 and LIST 4 and CODE LISTING 1 APPENDIX and CODE LISTING 2 APPENDIX.

LIST 4 - LOCATE TAG PROCESS

{300} Computer 40 desires location of tag 8-7.

{301} Computer 40 sends interrogator 7-1 an inventory command.

-continued
LIST 4 - LOCATE TAG PROCESS

{302} After inventory completed, computer 40 requests tag table information from interrogator 7-1.

{303} Computer 40 stores tag information in computer memory as table T-1.

{304} Computer 40 sends interrogator 7-C an inventory command.

{305} After inventory completed, computer 40 requests tag table information from interrogator 7-C.

{306} Computer 40 stores tag information in computer memory as table T-C.

{307} Applying location algorithms, computer 40 analyzes data from stored tag tables T-1 and T-C and determine from signal strength and antenna information the location of tag 8-7.

Code Listing

The actual computer code used in one preferred embodiment, comprising code in C program language and in assembly language for the processors identified above, is included in CODE LISTING 1 APPENDIX (corresponding to LIST 1 above) and CODE LISTING 2 APPENDIX (corresponding to LIST 2 above). The code modules are entitled as follows:

CODE LISTING 1—INTERROGATOR CODE MODULES

ADC.05H
C6805C9.H
CLOCK.05H
COLLECT.05H
COLLECT.H
COMCMDS.H

COMMANDS.05H
COMMUNIC.05H
CONFIG.H
DATABASE.05H
DELAYDEF.H
DELAYS.05H
DFTAGNIL.05H
DPOT.05H
EEPROM.05H
FLAGS.H
HW.05H
HW.H
INT.05C
INT.H
IO.05H
LCD.05H
MACROS.05H
NIUNULL.05H
RAM.05H
RS232.05H
SCANRSSI.05H
SCANRSSI.H
SCI.05H
STDDEF.H
TIMFR.05H
UTIL.05H
WATCHDOG.05H
XTAG.05H

CODE LISTING 2—TAG CODE MODUI

COMCMDS.H
COMMUNIC.05H
DELAYDEF.H
DELAYS.05H
EEPROM.05H
LCD.05H
MSGS.05H
STDDEF.H
TAG.05C
TAGCONFG.H

The sequencing represented by LIST 1, LIST 2, LIST 3 and LIST 4 is functional and represents concisely the operation of the preferred embodiment of the present invention. The actual detailed operation appears in CODE LISTING 1 APPENDIX and CODE LISTING 2 APPENDIX. The correspondence between the actual code listings and LIST 1 through LIST 4 is illustrated through the following examples.

1. The interrogator process flow shown in LIST 1 states 63 through 72 is implemented in CODE LISTING 1, module "COLLECT.05H" lines 286 to 325.
2. The interrogator process flow shown in LIST 1 state 70 is implemented in CODE LISTING 1, module "COLLECT.05H" line 212 and lines 145 to 173.
3. The interrogator process flow shown in LIST 1 states 64, 66 through 70 is implemented in CODE LISTING 1, module "COLLECT.05H" lines 181 to 223.
4. The interrogator process flow shown in LIST 1 states 60, 60-1, 60-2, . . . , 60-S is implemented in CODE LISTING 1, module "INT.05C" lines 352 to 507.
5. The tag process flow shown in LIST 2 states $9_1, \ldots, 93\text{-S}$ is implemented in CODE LISTING 2, module "TAG.05C" lines 502 to 524.
6. The tag process flow shown in LIST 2 states 94, 95 and 96 is implemented in CODE LISTING 2, module "TAG.05C" lines 387 to 394, lines 938 to 971 and lines 543 to 561.
7. The BEEP ON process flow shown in LIST 3 state 160 to 169 is implemented in CODE LISTING 1 module "MACROS.05H" lines 17 to 24 and lines 44 to 48, and in module COMMANDS.05H, lines 197 to 224. It will be apparent by one skilled in the art that the multiple steps of these states are implemented as a macro command series and include functions executed in other modules and that this series executes a beeper on command. Other functions are readily implemented using the macro command set included in or contemplated for the invention.
8. The BEEP ON process flow shown in LIST 3 state 167 is implemented in CODE LISTING 2 module "TAG.05C" lines 457 to 468, lines 384 to 419 and lines 572 to 600. It will be apparent by one skilled in the art that the multiple steps of the state 167 of LIST 3 are implemented by the functions included in this sequence of code series and that this series executes a beeper on command and that other functions are readily implemented.
9. The tag location process in LIST 4 states 301 and 304 is implemented in CODE LISTING 1, module "INT.05C" line 353 and module "COLLECT.05H" lines 243 to 325.
10. The tag location process in LIST 4 states 302 and 305 is implemented in CODE LISTING 1, module "INT.05C" line 358 and in module "COLLECT.05H" lines 437 to 442 and lines 352 to 421.

Further And Other Embodiments

Each of the different operations described in CODE LISTING 1 and CODE LISTING 2 may be implemented requiring only the execution of the different commands listed in TABLE 1 from the computer 40. Similarly, new and unique commands may be included by altering the current code using well known programming techniques. For example, as may be seen from the command list of TABLE 1 and CODE LISTING 1 and CODE LISTING 2, the system of the present invention also operates in the following ways:

A. messaging, where the tag appends a message to its address ID response to a broadcast (one-to-many) command, means existing then to quickly ascertain the status of a plurality of tags;

B. messaging, where the tag appends a message to its address ID response to a directed (one-to-one) command, means existing then for a tag to communicate data or other information to the interrogator and subsequently to a host system;

C. reverse messaging, where the interrogator adds a message to a specific tag's acknowledgement signal, means existing then to communicate data or other information from the interrogator or a host system via the interrogator to a tag.

In accordance with the present invention, the collision avoidance method employs randomization based on any of several communication parameters. In the preferred embodiment described in detail above, response delay is used as the parameter, however, the method can employ frequency, phase, amplitude or spatial variation parameters. Also, a linear recursive sequence generator seeded by the tag identification number may be used to generate a pseudo-random delay. In this manner, the diversity of time selection of responding tags expedites communication in the system.

Another mode of enhancement that may be employed in the interrogator apparatus is parameter enhancement. For instance, effective transmission power may be enhanced through the use of repeater apparatus. To implement the repeater, relay units rebroadcast a tag signal from a tag to a more distant interrogator unit that has a particular association with that particular tag. Such a system increases the effective range between tags and their associated interrogator.

Additional applications of the present invention use time measurement methods to determine the range and direction from an interrogator to a tag. The tag embodies a simple time measurement apparatus, such as a time-of-day clock and incorporates in the tag address response an indication of a time difference measurement. Such time measurements from tags allows an interrogator to determine the distance to a responding tag. Such enhancements are implemented by employing radio or acoustic transmissions along one path of the two way link between the tag and the interrogator. In addition, multiple beams may be used to provide direction measurement using conventional triangulation techniques.

Additional applications of the present invention relate to the use of external sensing apparatus incorporated in or associated with tags. A signal from an external sensor is incorporated within the tag address response to the interrogator synchronization command. The tag can also return elapsed time measurements along with the state of thermal, pressure or other outputs from physical sensors. This data affords an interrogator information as to the environment history of the tag or the current state of physical devices, such as the state of a lock or a continuity sensor.

The present invention is also operable wherein a plurality of batch collection periods are executed without the wake-up sequence. Such operation may employ tags which self-awaken with external stimulus. For instance, a thermal sensor may detect an out of range temperature of the tag environment. In such an example, only those tags having experienced an out of range circumstance would respond to a batch collection, all others would remain silent in the absence of a wake-up signal.

Wake-up and non-wake-up batch collection sequences may be combined. In such a system the interrogator rarely executes a batch collection process preceded with the wake-up command. Alternatively, the batch collection processes are performed without the wake-up period. Such a system extends tag battery life while still maintaining surveillance of the tags in the communication region. Only those tags, with unusual circumstances to report would respond to a batch collection in the absence of a wake-up command. By way of contrast, all tags respond to a sequence preceded by a wake-up command.

Other embodiments modify the wake-up signal using time, frequency or pulse coding methods to address only a subset of the tags in the communication region of the interrogator. Envisioned also are embodiments using infrared or acoustic energy for the wake-up signal.

Additional embodiments envisioned are directed wake-up using a special wake-up frequency followed by a tag address code which wakes-up only the specifically addressed tag.

While the invention has been particularly shown and described with reference to preferred embodiments thereof it will be understood by those skilled in the art that various changes in form and details may be made therein without departing from the spirit and scope of the invention.

We claim:

1. A communication system for communicating in a communication region comprising, interrogator including, interrogator memory for storing interrogator code including a broadcast command and a directed command and including bandwidth code for controlling the bandwidth of said collection periods, interrogator processor means connected for accessing said interrogator memory and for processing said interrogator code to sequence said broadcast command and said directed command, interrogator transceiver means connected to said interrogator processor means for sending said commands and receiving said responses in said communication region over said common communication channel including sending said broadcast command and said directed command a plurality of times, each of said tags having a unique tag ID and each including, a tag transceiver for sending said responses to and receiving said commands from said interrogator transceiver means over said common communication channel, a tag memory for storing information including tag code, a tag processor, connected to said tag transceiver to receive said broadcast command and said directed command said plurality of times, for processing said tag code to send one of said responses to said interrogator through said tag transceiver for one or more of said plurality of times, said processor including selection means for selecting one of said tag communication periods when one of said responses is to be sent.

2. The communication system of claim 1 wherein, said broadcast command requests tag ID'S from all tags, for each tag, said tag processor sends a tag ID with said response upon receipt of said broadcast command, for each tag for which said interrogator receives a tag ID, said interrogator processor sends said directed command to acknowledge that said tag ID has been received.

3. The communication system of claim 1 wherein each of said tags includes a controllable power means for providing power to said tag transceiver in a low-power state for a sleep mode and in a normal-power state for an awake mode where said tag processor controls said power means to select said lower power state or said normal-power state.

4. The communication system of claim 3 wherein, said broadcast command requests all tags but one specific tag to go to said sleep mode, for each tag except said one specific tag, said tag processor upon receipt of said broadcast command causes said tag to go to said sleep mode, for said specific tag, said interrogator processor sends said directed command to command an action by said specific tag, said tag processor for said specific tag upon receipt of said directed command sends said response including the tag ID to said interrogator.

5. The communication system of claim 3 wherein said interrogator includes wake-up means for sending a wake-up signal to said tags and wherein each of said tags includes wake-up detection means connected to said tag transceiver and responsive to said wake-up signal from said interrogator for providing a signal to said tag processor to cause switching to said normal-power state.

6. The communication system of claim 3 wherein said tag transceiver in each of said tags includes, a radio frequency transmitter, a radio frequency receiver, an antenna connected to said transmitter and receiver.

7. The communication system of claim 2 wherein said interrogator collects the tag ID's from tags in the communication region using communications between said interrogators and said tags during said plurality of collection periods, said interrogator having in said interrogator code, synchronizing code for sending synchronizing signals to said tags to initiate each of said collection periods, each said tag having means for inhibiting sending a tag ID after receipt of said directed command.

8. The communication system of claim 7 wherein said interrogator establishes said collection periods as collection periods CP(1), CP(2), . . . , CP(p), . . . , CP(P) having respectively listen periods LP(1), LP(2), . . . , LP(p), . . . , LP(P) and having respectively acknowledge periods AP(1), AP(2), . . . , AP(p), . . . , AP(P).

9. The communication system of claim 8 wherein said bandwidth code sets the bandwidth of each collection period by setting the duration of the respective listen period.

10. The communication system of claim 9 wherein for one or more subsequent listen periods after the first listen period LP(1), the listen periods are shorter in duration than the listen period LP(1).

11. The communication system of claim 10 wherein said first listen period LP(1) and said one or more subsequent listen periods each have durations that permit receipt of separate transmissions of tag IDs from a plurality of tags.

12. The communication system of claims 11 wherein for a plurality of said one or more listen periods, each successive listen period is approximately one-half the duration of the preceding listen period.

13. The communication system of claim 9 wherein for said listen periods, each of said tags has response means for distributing the tag ID to a particular response time during the respective listen period.

14. The communication system of claim 13 wherein said particular response time is determined for each said tag by a hash table algorithm using the tag ID for said tag.

15. The communication system of claim 13 wherein said response means includes means to randomly determine said particular response time for each said tag.

16. The communication system of claim 2 wherein said interrogator collects the tag ID's from tags in the communication region using communications between said interrogators and said tags during said plurality of collection periods, said interrogator having in said interrogator code, synchronizing code for sending synchronizing signals to said tags to initiate each of said collection periods, each said tag having means for inhibiting sending a tag ID after receipt of said directed command and for sending a tag ID only once for each collection period.

17. The communication system of claim 1 wherein said interrogator transceiver includes, a radio frequency transmitter, a radio frequency receiver, an antenna connected to said transmitter and receiver.

18. The communication system of claim 1 wherein said interrogator transceiver means includes a plurality of transceivers each including, an antenna, a radio frequency transmitter connected to said interrogator processor to provide output signals to said antenna for transmission to said tags, a radio frequency receiver connected to said antenna to receive signals from said tags to provide input signals to said interrogator processor.

19. The communication system of claim 1 wherein said interrogator transceiver means includes a plurality of spatially diverse transceivers each including, an antenna having a polarization, a radio frequency transmitter connected to said interrogator processor to provide output signals to said antenna for transmission to said tags, a radio frequency receiver connected to said antenna to receive signals from said tags to provide input signals to said interrogator processor, wherein the polarization for an antenna of one of said transceivers is different from the polarization of an antenna of another one of said transceivers.

20. The communication system of claim 1 wherein said interrogator transceiver means includes, a plurality of transceivers where a particular one of said transceivers is selectable to be active for said transceiver means, each transceiver including, an antenna, a radio frequency transmitter connected to said interrogator processor to provide output signals to said antenna for transmission to said tags, a radio frequency receiver connected to said antenna to receive signals from said tags to provide input signals to said interrogator processor, wherein the antenna from one or more of said transceivers is polarization diverse and spatially diverse from the antenna of another one of said transceivers, signal strength detection means for detecting the signal strength of the signals received from said tags and for providing a signal strength indication to said interrogator processor from each of said receivers, a switch under control of said interrogator processor for selecting, for each of said tags, a transceiver having the highest signal strength as said particular one of said transceivers.

21. The communication system of claim 1 wherein each of said tags includes a battery power unit.

22. The communication system of claim 1 wherein said interrogator includes an interface unit for providing communications relating to tags from and to a computer.

23. The communication system of claim 1 wherein one or more of said tags is connected to a unit for communicating information between said interrogator and said unit.

24. The communication system of claim 1 wherein said tags have sleep and awake modes and said interrogator collects messages from said tags in the communication region using communications between said interrogators and said tags during a collection period, said interrogator having in said interrogator code, synchronizing code for sending a synchronizing signal to said tags to initiate said collection period, each said tag having in said tag code, mode code for controlling the sleep mode and awake mode of the tag processor, sensing code for sensing said synchronizing signal if said tag is in said awake mode, send code for sending said response including a tag message to said interrogator in response to said synchronizing signal from said interrogator if said tag is in the awake mode.

25. The communication system of claim 24 wherein said tag processor is interruptible in response to an interrupt signal and wherein said system includes a unit connected to said tag for providing said interrupt signal for signaling the presence of said tag message and wherein said mode code is responsive to said interrupt signal to cause said tag to be in the awake mode.

26. The communication system of claim 25 wherein said interrogator processor after receipt of said tag message sends an acknowledge signal as a directed command to said tag.

27. The communication system of claim 26 wherein said acknowledge signal causes said tag to be in the sleep mode.

28. The communication system of claim 24 wherein said tag is connected to a unit providing said tag message and said interrogator processor receives said tag message from said unit when said tag is in the awake mode.

29. The communication system of claim 28 wherein said interrogator transceiver means includes, a plurality of transceivers where a particular one of said transceivers is selectable to be active for said transceiver means, each transceiver including, an antenna, a radio frequency transmitter connected to said interrogator processor to provide output signals to said antenna for transmission to said tags, a radio frequency receiver connected to said antenna to receive signals from said tags to provide input signals to said interrogator processor, wherein the antenna from one or more of said transceivers is polarization diverse and spatially diverse from the antenna of another one of said transceivers, signal strength detection means for detecting the signal strength of the signals received from said tags and for providing a signal strength indication to said interrogator processor from each of said receivers, a switch under control of said interrogator processor for selecting for each of said tags a transceiver having the highest signal strength as said particular one of said transceivers.

30. The communication system of claim 24 wherein said tag processor is operable in a low-power state during said sleep mode and is operable in a normal-power state during said awake mode and is operable to be set in said normal-power state in response to a reset signal and wherein said tag processor includes a reset input for resetting tag processor operation and includes a unit connected to said reset input for providing said reset signal.

31. The communication system of claim 1 wherein said tags have sleep and awake modes and said interrogator collects messages from said tags in the communication region using communications between said interrogators and said tags during a collection period, said interrogator having in said interrogator code, wake-up code for sending a wake-up signal to said tags, synchronizing code for sending a synchronizing signal to said tags to initiate a collection period, each said tag having a controllable power gate for providing power to said tag transceiver in a low-power state and in a normal-power state where said tag processor controls said power gate to select said normal-power state in response to said wake-up signal, and each said tag having in said tag code, code for controlling the sleep mode in the low-power state, code for sensing said synchronizing signal if said tag is in said awake mode, code for sending a message as part of a response to said interrogator in response to a synchronizing signal from said interrogator if said tag is in the awake mode.

32. A communication system for efficiently communicating with a large number of tags in a communication region formed by a plurality of cells where the location of the tags in the region may not be known and where tags may be removed from or introduced into the region comprising, a plurality of interrogators, one for each cell, for communicating with said tags in said plurality of cells, each cell having a corresponding interrogator, said tags and said corresponding interrogator communicating over a common communication channel with a sequence including a plurality of collection periods, said collection periods including interrogator communication periods for said interrogator to send commands over said communication channel to said tags and including tag communication periods for said tags to send responses over said communication channel to said corresponding interrogator, where said responses from different tags collide if tag communication periods for said different tags coincide and where said responses from said different tags do not collide if the tag communication periods for said different tags do not coincide, each of said interrogators including, interrogator memory for storing interrogator code including a broadcast command and a directed command and including bandwidth code for controlling the bandwidth of said collection periods, interrogator processor means connected for accessing said interrogator memory and for processing said interrogator code to send said broadcast command and to send said directed command, interrogator transceiver means connected to said interrogator processor means for sending said commands and receiving said responses tags within the interrogator cell over said common communication channel, said communications including sending said broadcast command and said directed command a plurality of times, each of said tags located in one or more of said cells within said communication region, each of said plurality of tags including, a tag transceiver for sending and receiving communications to and from said interrogator transceiver means over said common communication channel, a tag memory for storing information including tag code, a tag processor, connected to said tag transceiver, for processing said tag code to receive said broadcast command and said directed command said plurality of times, and to send a response to said interrogator for one or more of said plurality of times, a computer connecting to each of said interrogators for controlling the operation of said interrogators.

33. The communication system of claim 32 wherein said cells are not contiguous.

34. The communication system of claim 32 wherein said cells are overlapping.

35. The communication system of claim 32 wherein each tag has a unique tag ID.

36. The communication system of claim 32 includes controllable power means for providing power to said tag transceiver in a low-power state and in a normal-power state where said tag processor controls said power means to select said normal-power state or said low-power state.

37. The communication system of claim 36 wherein said interrogator includes wake-up means for sending a wake-up signal to said tags and wherein each of said tags includes wake-up detection means connected to said tag transceiver and responsive to said wake-up signal from said interrogator for providing a signal to said tag processor to cause switching to said normal-power state.

38. The communication system of claim 32 wherein said tag transceiver in each of said tags includes, a radio frequency transmitter, a radio frequency receiver, an antenna connected to said transmitter and receiver.

39. The communication system of claim 32 wherein each of said tags has a unique tag ID and said interrogator collects the tag ID's from tags in the communication region using communications between said interrogators and said tags during a plurality of collection periods, said broadcast command requests tag ID's from all tags, for each tag, said tag processor sends a tag ID with said response upon receipt of said broadcast command, for each tag for which said interrogator receives a tag ID, said interrogator processor sends said directed command to acknowledge that said tag ID has been received, said interrogator having in said interrogator code, synchronizing code for sending synchronizing signals to said tags to initiate each of said collection periods, each said tag having means for inhibiting sending a tag ID after receipt of said directed command.

40. The communication system of claim 32 wherein said interrogator transceiver means includes a plurality of transceivers each including, an antenna, a radio frequency transmitter connected to said interrogator processor to provide output signals to said antenna for transmission to said tags, a radio frequency receiver connected to said antenna to receive signals from said tags to provide input signals to said interrogator processor.

41. The communication system of claim 32 wherein said interrogator transceiver means includes a plurality of spatially diverse transceivers each including, an antenna having a polarization, a radio frequency transmitter connected to said interrogator processor to provide output signals to said antenna for transmission to said tags, a radio frequency receiver connected to said antenna to receive signals from said tags to provide input signals to said interrogator processor, wherein the polarization for an antenna of one of said transceivers is different from the polarization of an antenna of another one of said transceivers.

42. The communication system of claim 32 wherein each of said tags includes a battery power unit.

43. The communication system of claim 32 wherein said interrogator includes an interface unit for providing communications relating to tags from and to a computer.

44. The communication system of claim 32 wherein one or more of said tags is connected to one or more units for communicating for each tag information between said interrogator and said one or more units through said tag.

45. The communication system of claim 32 wherein said tags have sleep and awake modes and said interrogator collects messages from said tags in the communication region using communications between said interrogators and said tags during a collection period, said interrogator having in said interrogator code, synchronizing code for sending a synchronizing signal to said tags to initiate a collection period, each said tag having in said tag code, mode code for controlling the sleep mode and awake mode of the tag processor, sensing code for sensing said synchronizing signal if said tag is in said awake mode, send code for sending to said interrogator a response including a tag message in response to a synchronizing signal from said interrogator if said tag is in the awake mode.

46. The communication system of claim 32 wherein said tags have sleep and awake modes and said interrogator collects messages from said tags in the communication region using communications between said interrogators and said tags during a collection period, said interrogator having in said interrogator code, wake-up code for sending a wake-up signal to said tags, synchronizing code for sending a synchronizing signal to said tags to initiate a collection period, each said tag having a controllable power gate for providing power to said tag transceiver in a low-power state and in a normal-power state where said tag processor controls said power gate to select said normal-power state in response to said wake-up signal, and each said tag having in said tag code, code for controlling the sleep mode in the low-power state, code for sensing said synchronizing signal if said tag is in said awake mode, code for sending a response including a tag message to said interrogator in response to a synchronizing signal from said interrogator if said tag is in the awake mode.

47. Apparatus for identifying items through transmission and reception of signals comprising:

a plurality of tags, one for each of said items;

an interrogator for communicating with said tags, said tags and said interrogator communicating over a common communication channel with a communication protocol including a sequence, common to all tags, said sequence including a plurality of collection periods, each collection period having, interrogator communication periods for said interrogator to send commands over said communication channel to said tags, a listen period having time slots during which one or more of said plurality of tags can communicate a tag identifying signal to said interrogator, where tag identifying signals from different tags collide if the time slots for said tag identifying signals for said different tags coincide and where tag identifying signals from different tags do not collide if the time slots for said tag identifying signals for said different tags do not coincide, an acknowledge period during which said interrogator can communicate acknowledge signals to said tags, said interrogator including, bandwidth control means for controlling the bandwidth of the collection periods by controlling the duration of the listen periods, signal sending means, operable for each of said collection periods, for sending a signal to the tags to signal the commencement of the listen period, receiver means, operable for each of said collection periods, for receiving tag identifying signals during said listen period from a subset of said tags, acknowledge sending means, operable for each of said collection periods, for sending acknowledge signals during said acknowledge period to said subset of said tags, each of said tags including, signal receiving means, operable for one or more of said collection periods, for receiving the signal from the signal sending means so as to identify the start of the listen period, identification sending means, operable for one or more of said collection periods, for sending a tag identifying signal during the listen period, acknowledge receiving means, operable for one or more of said collection periods, for receiving an acknowledge signal from said interrogator during the acknowledge period.

48. In a communication system for communicating in a communication region over a common communication channel between an interrogator and a plurality of tags, where the interrogator includes, interrogator memory for storing interrogator code including a broadcast command and a directed command, interrogator processor means connected for accessing said interrogator memory, interrogator transceiver means connected to said interrogator processor means, and where each of said tags includes, a tag transceiver for sending and receiving communications to and from said interrogator transceiver means over said common communication channel, a tag memory for storing information including tag code, a tag processor, connected to said tag transceiver, the method comprising, processing, in said interrogator processor, said interrogator code to sequence said broadcast command and said directed command a plurality of times, sending and receiving communications in said communication region over said common communication channel by said interrogator transceiver, including sending said broadcast command and said directed command said plurality of times, said communications having a sequence including a plurality of collection periods, said collection periods including interrogator communication periods for said interrogator to send commands over said communication channel to said tags and including tag communication periods for said tags to send responses over said communication channel to said interrogator, where said responses from different tags collide if tag communication periods for said different tags coincide and where said responses from said different tags do not collide if the tag communication periods for said different tags do not coincide, in each of said tags, receiving said broadcast command and said directed command said plurality of times by said tag transceiver, processing said tag code to send a response to said interrogator through said tag transceiver for one or more of said plurality of times, for each of two or more of said plurality of tags, sending a response over said common communication channel such that at some times, a collision of responses occurs during one of said plurality of times and such that at another one of said plurality of times, no collision of responses occurs.

49. The communication method of claim 48 wherein, said broadcast command requests tag ID's from all tags, for each tag, said tag processor sends a tag ID with said response upon receipt of said broadcast command, for each tag for which said interrogator receives a tag ID, said interrogator processor sends said directed command to acknowledge that said tag ID has been received.

50. The communication method of claim 49 has a unique tag ID and said interrogator collects the tag ID's from tags in the communication region using communications between said interrogators and said tags during a plurality of collection periods, said interrogator, executing synchronizing code in said interrogator code for sending synchronizing signals to said tags to initiate each of said collection periods, executing bandwidth code in said interrogator code for controlling the bandwidth of said collection periods, each said tag having means for inhibiting sending a tag ID after receipt of a command.

51. The communication method of claim 50 wherein said interrogator establishes said collection periods as collection periods CP(1), CP(2), ..., CP(p), ..., CP(P) having respectively listen periods LP(1), LP(2), ..., LP(p), ..., LP(P) and having respectively acknowledge periods AP(1), AP(2), ..., AP(p), ..., AP(P).

52. The communication method of claim 51 wherein said bandwidth code sets the bandwidth of each collection period by setting the duration of the respective listen period.

53. The communication method of claim 52 wherein for one or more subsequent listen periods after the first listen period LP(1), the listen periods are shorter in duration than the listen period LP(1).

54. The communication method of claim 53 wherein said first listen period LP(1) and said one or more subsequent listen periods each have durations that permit receipt of separate transmissions of tag IDs from a plurality of tags.

55. The communication system of claim 54 wherein for a plurality of said one or more listen periods, each successive listen period is approximately one-half the duration of the preceding listen period.

56. The communication method of claim 52 wherein for said listen periods, each of said tags has response means for distributing the tag ID to a particular response time during the respective listen period.

57. The communication method of claim 56 wherein said particular response time is determined for each said tag by a hash table algorithm using the tag ID for said tag.

58. The communication method of claim 56 wherein said response means includes means to randomly determine said particular response time for each said tag.

59. The communication method of claim 49 wherein each of said tags has a unique tag ID and said interrogator collects the tag ID's from tags in the communication region using communications between said interrogators and said tags during a plurality of collection periods, said interrogator executing said interrogator code including, executing synchronizing code for sending synchronizing signals to said tags to initiate each of said collection periods, executing bandwidth code for controlling the bandwidth of said collection periods, each said tag inhibiting sending a tag ID after receipt of said directed command and for sending a tag ID only once for each collection period.

60. The communication method of claim 48 includes a controllable power means for providing power to said tag transceiver in a low-power state for a sleep mode and in a normal-power state for an awake mode where said tag processor controls said power means to select said low-power state or said normal-power state.

61. The communication method of claim 60 wherein, said broadcast command requests all tags but one specific tag to go to said sleep mode, for each tag except said one specific tag, said tag processor upon receipt of said broadcast command causes said tag to go to said sleep mode, for said specific tag, said interrogator processor sends said directed command to command an action by said specific tag, said tag processor for said specific tag upon receipt of said directed command sends said response including the tag ID to said interrogator.

62. The communication method of claim 60 wherein said interrogator includes wake-up means for sending a wake-up signal to said tags and wherein each of said tags includes wake-up detection means connected to said tag transceiver and responsive to said wake-up signal from said interrogator for providing a signal to said tag processor to cause switching to said normal-power state.

63. Apparatus for identifying items through transmission and reception of signals comprising:

a plurality of tags, one for each of said items;

an interrogator for communicating with said tags, said tags and said interrogator communicating over a common communication channel with a communication protocol, said communication protocol including a sequence common to all tags, said sequence including a plurality of collection periods, each collection period having, a synchronization period during which said interrogator can communicate with said plurality of tags, a listen period having time slots during which one or more of said plurality of tags can communicate a tag identifying signal to said interrogator over said communication channel, where tag identifying signals from different tags collide if the time slots for said tag identifying signals for said different tags coincide and where tag identifying signals from different tags do not collide if the time slots for said tag identifying signals for said different tags do not coincide, and an acknowledge period during which said interrogator can communicate acknowledge signals to said tags over said communication channel, said interrogator including, interrogator memory for storing interrogator code including one or more broadcast commands and one or more directed commands and including bandwidth code for controlling the bandwidth of said tag communication periods, interrogator processor means connected for accessing said interrogator memory and for processing said interrogator code to sequence said broadcast commands and said directed commands, signal sending means, operable for each of said collection periods, for sending during said synchronization period one of said broadcast commands over the common communication channel to the tags to signal the commencement of the listen period, receiver means, operable for each of said collection periods, for receiving tag identifying signals over the common communication channel from said tags during said listen period, acknowledge sending means, operable for each of said collection periods, for sending acknowledge signals as directed commands over the common communication channel to said tags during said acknowledge period, each of said tags including, signal receiving means, operable for one or more of said collection periods, for receiving said one of said broadcast commands from said signal sending means during said synchronization period so as to identify the start of the listen period, identification sending means, operable for one or more of said collection periods, for sending a tag identifying signal during one of a plurality of time slots during the listen period, acknowledge receiving means, operable for one of said collection periods, for receiving an acknowledge signal from said interrogator during the acknowledge period, control means, operable for said one or more of said collection periods, for controlling said identification sending means, said control means operative, before said acknowledge receiving means receives said acknowledge signal and during each of said one or more of said collection periods, for selecting one of said time slots for sending a tag identifying signal whereby two or more of said plurality of tags may each send a respective tag identifying signal over said common communication channel such that during one time slot of a listen period a collision of tag identifying signals may occur and such that during another time slot of a listen period no collision of tag identifying signals occurs, said control means operative, after said acknowledge receiving means receives said acknowledge signal, for inhibiting said identification sending means from sending said tag identifying signal.

64. The communication system of claim 63 wherein said interrogator code includes code for controlling the duration of said collection periods.

65. The communication system of claim 64 wherein said interrogator code establishes said collection periods as the P collection periods CP(1), CP(2), . . . , CP(p), . . . , CP(P) having respectively P synchronization periods SP(1), SP(2), . . . , SP(p), . . . , SP(P), having respectively the P listen periods LP(1), LP(2), . . . , LP(p), . . . , LP(P) and having respectively the P acknowledge periods AP(1), AP(2), . . . , AP(p), . . . , AP(P) and wherein each of said listen periods has a plurality of time slots.

66. The communication system of claim 65 period LP(1) is followed by one or more subsequent listen periods LP(2), . . . , LP(p), . . . , LP(P) and where one or more of the subsequent listen periods LP(2), . . . , LP(p), . . . , LP(P) are shorter in duration than the first listen period LP(1) whereby one or more of said subsequent listen periods have fewer time slots than said first listen period.

* * * * *